United States Patent
Tamagawa

(10) Patent No.: US 9,256,016 B2
(45) Date of Patent: Feb. 9, 2016

(54) CELLULOSE ESTER FILMS, POLARIZING PLATES AND LIQUID CRYSTAL DISPLAYS EQUIPPED THEREWITH

(75) Inventor: Minori Tamagawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 45 days.

(21) Appl. No.: 14/003,627

(22) PCT Filed: Mar. 2, 2012

(86) PCT No.: PCT/JP2012/055422
§ 371 (c)(1),
(2), (4) Date: Sep. 6, 2013

(87) PCT Pub. No.: WO2012/124514
PCT Pub. Date: Sep. 20, 2012

(65) Prior Publication Data
US 2013/0335681 A1    Dec. 19, 2013

(30) Foreign Application Priority Data
Mar. 11, 2011   (JP) ................... 2011-053946

(51) Int. Cl.
*G02B 1/10*     (2015.01)
*G02F 1/13363*  (2006.01)
*G02B 5/32*     (2006.01)
*C08J 5/18*     (2006.01)
(Continued)

(52) U.S. Cl.
CPC ... *G02B 5/32* (2013.01); *C08J 5/18* (2013.01); *C08L 1/10* (2013.01); *C08L 1/14* (2013.01);
(Continued)

(58) Field of Classification Search
CPC ...... C08J 2301/12; C08J 7/047; G02B 1/105; G02B 5/30; Y10T 428/105; B32B 2457/202
USPC ............................ 428/1.33; 349/96, 117–118
See application file for complete search history.

(56) References Cited

U.S. PATENT DOCUMENTS

2009/0068377 A1   3/2009   Kuki
2009/0096962 A1*  4/2009   Shelton et al. ............... 349/96
(Continued)

FOREIGN PATENT DOCUMENTS

KR   10-2010-0016485   2/2010
KR   10-2010-0053596   5/2010

OTHER PUBLICATIONS

Korean Office Action, Notice of Preliminary Rejection, Korean Patent Application No. 10-2013-7023600. Mailing Date: Oct. 20, 2014 and English translation thereof.
(Continued)

*Primary Examiner* — Sophie Hon
(74) *Attorney, Agent, or Firm* — Lucas & Mercanti, LLP

(57) ABSTRACT

The cellulose ester film contains a cellulose ester(s) having substitution(s) by an acyl group(s) having 3 to 4 carbon atoms, or an acyl group(s) having 2 carbon atoms and an acyl group(s) having 3 to 4 carbon atoms, the cellulose ester having a total degree of substitution with the acyl group(s) of not less than 1.0 and less than 2.0 and sufficing a weight average molecular weight of not more than 150000; a sugar ester compound(s) having not less than one and not more than 12 sugar unit structures, the sugar unit structure being at least one of a pyranose structure or furanose structure, wherein an average percentage of substitution in the sugar unit structure is 35% to 75%; and the cellulose ester film having a film thickness of i0 to 35 μm. The cellulose ester film is used for polarizing plates and liquid crystal displays equipped.

8 Claims, 2 Drawing Sheets

(51) Int. Cl.
  *C08L 1/14* (2006.01)
  *C08L 1/10* (2006.01)
  *G02B 5/30* (2006.01)
  *C08K 5/151* (2006.01)

(52) U.S. Cl.
  CPC ............ *G02B 1/105* (2013.01); *G02F 1/13363* (2013.01); *B32B 2457/202* (2013.01); *C08J 2301/10* (2013.01); *C08J 2301/14* (2013.01); *C08K 5/151* (2013.01); *G02B 5/3025* (2013.01); *G02B 5/3083* (2013.01); *Y10T 428/105* (2015.01)

(56) References Cited

U.S. PATENT DOCUMENTS

2010/0182548 A1\* 7/2010 Suzuki et al. .................. 349/96
2011/0058127 A1\* 3/2011 Toyooka ......................... 349/96

OTHER PUBLICATIONS

International Preliminary Report on Patentability and English translation thereof.

\* cited by examiner

CELLULOSE ESTER FILMS, POLARIZING PLATES AND LIQUID CRYSTAL DISPLAYS EQUIPPED THEREWITH

CROSS-REFERENCE TO RELATED APPLICATIONS

This application is a 371 of PCT/JP2012/055422 filed on Mar. 2, 2012, which claims the priority of Japanese Application Serial No. 2011-053946 filed on Mar. 11, 2011, the contents of each of which are incorporated herein by reference.

BACKGROUND

1. Technical Field

The present invention relates to cellulose ester films, and polarizing plates and liquid crystal displays comprising such cellulose ester films. For more details, the present invention relates to cellulose ester films having high transmittance, and polarizing plates with less deterioration at the time when durability is tested and liquid crystal displays having high contrast, both of which comprise such cellulose ester films.

2. Description of Related Arts

Liquid crystal displays (LCDs) have been widely used in late years because they have been getting thinner, and have had lighter weight and less power consumption. In particular with regard to lightweighting, measures to make components more power saving and thinner have advanced. Additionally, it has been recently demanded to achieve new functions such as still lower power consumption or 3D. For both of the lower power consumption and 3D, improved utilization efficiency of light is required. To that end, it is considered to use LED as a backlight and to increase the transmittance of the component. When it comes to the transmittance of the component, it is considered to lessen the gaps of ribs, slits and the like for liquid crystal cells and to increase the transmittance for films.

For example, to increase the transmittance of the film, it is considered to thin the film thickness. Yet, in the case of retardation films, making the film thinner leads to difficulties in developing retardation, which has been problematic.

In view of this, retardation films using cellulose esters with a lower degree of substitution were proposed (see, for example, Patent Document 1). Yet, there were problems of low transmittance of the film and poor compatibility with retardation.

Further, retardation films using cellulose esters with a lower substitution degree and carbohydrate organic esters were proposed (see, for example, Patent Document 2). Yet, in the case of monosaccharide esterified products, the polarizing film might have a less capability to inhibit shrinkage (shrinkage inhibiting capability) particularly when made to a thin film. Furthermore, when retardation films using cellulose esters with a lower substitution degree and carbohydrate organic esters were subjected to rework (see, for example, Patent Document 3), although the retardation is high, there occurred a defect of polarizing plates scattering into strips or splitting off to leave liquid crystal cells.

PRIOR ART REFERENCES

Patent Documents

Patent Document 1: United State Patent No. 2009/096962
Patent Document 2: United State Patent No. 2003/171458
Patent Document 3: Japanese Patent Application Laid-Open Publication No. 2010-170128

SUMMARY

Problem to be Solved by the Invention

The present invention was made in view of the above problems and circumstances; and an object thereof is to provide cellulose ester films having high transmittance and methods of producing the cellulose ester films. Further, another object is to provide polarizing plates with less deterioration at the time when durability is tested and liquid crystal displays having high contrast, both of which comprise such cellulose ester films.

Means for Solving the Problem

The above object of the present invention can be achieved by the following constitution.

1. A cellulose ester films comprising a cellulose ester(s) having substitution(s) by an acyl group(s) having 3 to 4 carbon atoms, or an acyl group(s) having 2 carbon atoms and an acyl group(s) having 3 to 4 carbon atoms, the cellulose ester having a total degree of substitution with the acyl group(s) of not less than 1.0 and less than 2.0 and sufficing a weight average molecular weight of not more than 150000; and a sugar ester compound(s) having not less than one and not more than 12 sugar unit structures, the sugar unit structure being at least one of a pyranose structure or furanose structure, wherein an average percentage of substitution in the sugar unit structure is 35% to 75%; and further the cellulose ester film having a film thickness of 10 to 35 μm.

2. The cellulose ester film according to the above-mentioned 1, wherein the above-mentioned sugar ester compound is a compound represented by the following general formula (1):

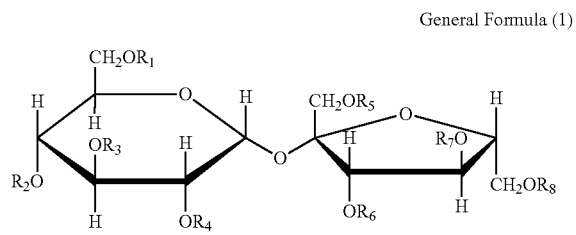

General Formula (1)

wherein an average degree of substitution of the above-mentioned sugar ester compound is 2.8 to 6.0.

3. The cellulose ester film according to the above-mentioned 1 or 2, wherein the above-mentioned sugar ester compound is a mixture of compounds with different degrees of substitution.

4. The cellulose ester film according to any of the above-mentioned 1 to 3, wherein a degree of substitution with an acyl group(s) having 3 or more carbon atoms of the above-mentioned cellulose ester is not less than 0.9 and less than 2.0.

5. The cellulose ester film according to any of the above-mentioned 1 to 4, wherein the number of total carbon atoms of the above-mentioned acyl group(s) of the above-mentioned cellulose ester is more than 4.4.

6. The cellulose ester film according to any one of the above-mentioned 1 to 5, wherein a value of retardation in a plane Ro(590) of the above-mentioned cellulose ester film is in a range of from 40 to 70 mm; a value of retardation in a thickness direction Rt(590) is in a range from 100 to 200 nm; and a film contrast is 7000 to 10000.

7. A polarizing plate comprising the cellulose ester film according to any one of the above-mentioned 1 to 6.

8. A liquid crystal display comprising the cellulose ester film according to any one of the above-mentioned 1 to 6.

Effect of the Invention

By the above means of the present invention, cellulose ester films having high transmittance and a method for producing the films can be provided. Further, polarizing plates with less deterioration at the time when durability is tested and liquid crystal displays having high contrast, both of which comprise such cellulose ester films, can be provided.

DETAILED DESCRIPTION

Figure 1:
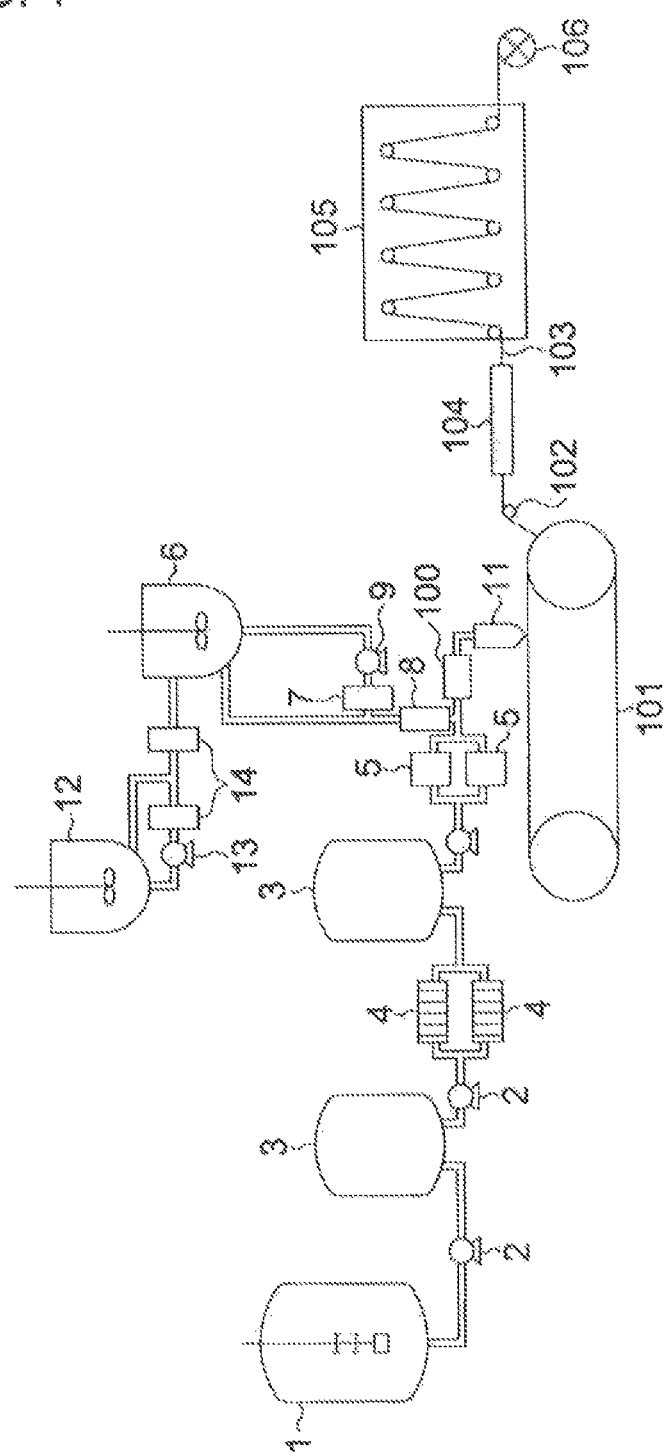
FIG. 1 is a figure representing production of the monolayer cellulose resin film of the present invention.

Hereinafter, although best modes for carrying out the present invention will be described in detail, the present invention is not limited thereto.

The cellulose ester films of the present invention are characterized by comprising a cellulose ester(s) having substitution(s) by an acyl group(s) having 3 to 4 carbon atoms, or an acyl group(s) having 2 carbon atoms and an acyl group(s) having 3 to 4 carbon atoms, the cellulose ester having a degree of substitution (total degree of substitution) with the acyl group(s) of not less than 1.0 and less than 2.0 and sufficing a weight average molecular weight of not more than 150000; and a sugar ester compound(s) having not less than one and not more than 12 sugar unit structures, the sugar unit structure being at least one of a pyranose structure or furanose structure, wherein an average percentage of substitution in the sugar unit structure is 35% to 75%; and further the cellulose ester film having a film thickness of 10 to 35 μm. These characteristics are common technological features of the inventions.

It is preferred that the total number of the carbon atoms of the acyl substituent group be more than 4.4 and the degree of substitution of the acyl group having 3 or more carbon atoms be not less than 0.9 and less than 2.0.

Further, in the present invention, the total number of the carbon atoms of the acyl substituent group refers to the sum total of numerical values for all types of the acyl substituent groups substituted per glucose unit, which numerical values are obtained by multiplying the number of carbon atoms of each of the acyl groups by the degree of substitution thereof. To be specific, for example, in cases where the degree of substitution with acetyl groups per glucose unit is 0.1 and the degree of substitution with propionyl groups is 1.5;

The number of the carbon atoms derived from the acetyl groups: 2×0.1=0.2

The number of the carbon atoms derived from the propionyl groups: 3×1.5=4.5. Thus, the total number of the carbon atoms is determined as 4.7.

The present invention and constituents thereof, and modes and embodiments for carrying out the present invention will be described in detail below. Note that, in the present application, "to" is used to intend to include numerical values described before and after it as the lower limit value and upper limit value. Further, the definition of the following terms and symbols used in the present application is as follows:

(1) The symbol "nx" is a refractive index in a direction where the refractive index in the plane is maximum (that is, slow axial direction); "ny" is a refractive index in the direction vertical to the slow axis in the plane (that is, fast axis direction); and "nz" a refractive index in the thickness direction.

(2) The term "retardation in the in-plane direction Ro" refers to a value of retardation in the film (layer) plane as measured at 23° C. and 55% RH using light with a wavelength of 590 nm. Ro can be determined by an equation: Ro=(nx−ny)×d, wherein the refractive index at a wavelength of 590 nm in the slow axial direction and fast axis direction of the film (layer) is designated as nx and ny, respectively; and d (nm) denotes the thickness of the film (layer).

(3) The term "retardation in the thickness direction Rt" refers to a value of retardation as measured at 23° C. and 55% RH using light with a wavelength of 590 nm. Rt can be determined by an equation: Rt={(nx+ny)/2−nz}×d, wherein the refractive index at a wavelength of 590 nm in the slow axial direction, fast axis direction and thickness direction of the film (layer) is designated as nx, ny and nz, respectively; and d (nm) denoted the thickness of the film (layer).

(Cellulose Ester Film)

The cellulose ester film of the present invention is, as compared with conventional cellulose ester films, a thinner film and a film having both of phase difference and transmittance, and higher mechanical strength. By employing this, polarizing plates whose shrinkage was inhibited and whose reworkability was improved, and liquid crystal displays with high contrast could be provided.

<Cellulose Ester>

The cellulose ester film of the present invention are required to comprise a cellulose ester(s) having substitution(s) by an acyl group(s) having 3 to 4 carbon atoms, or an acyl group(s) having 2 carbon atoms and an acyl group(s) having 3 to 4 carbon atoms, the cellulose ester having a degree of substitution (total degree of substitution) with the acyl group(s) of not less than 1.0 and less than 2.0 and having a weight average molecular weight of not more than 150000. From the viewpoint of retardation developing property, the degree of substitution with acyl groups having 3 carbon atoms or more in the cellulose ester is preferably not less than 0.9 less than 2.0. In addition, from the viewpoint of water resistance, the cellulose esters preferably contain cellulose esters wherein the total number of the carbon atoms of the above-mentioned acyl group is in a range of more than 4.4. Examples of the acyl groups in which the number of carbon atoms is in a range of 2 to 4 include acetyl groups, a propionyl groups, and butanoyl groups.

Glucose units that are composed of cellulose and linked via β-1,4 bonds have free hydroxyl groups at positions 2, 3 and 6. Cellulose esters are polymers wherein part or all of those hydroxyl groups are acylated by the acyl groups. The total degree of substitution of the acyl group means a proportion per glucose unit at which all of the hydroxyl groups located at positions 2, 3 and 6 are acylated (100% acylation corresponds to a degree of substitution of 3). A method of measuring the degree of substitution with the acyl group can be carried out in reference to ASTM D-817-91.

The degree of substitution (total degree of substitution) with the acyl group is preferably 1.1 to 1.9 and further preferably 1.2 to 1.8. Further, the degree of substitution of the acyl group having 3 carbon atoms or more is preferably 1.0 to 1.9 and further preferably 1.4 to 1.8.

It has been said that deterioration of surface quality and increase in haze by drawing prone to take place in cellulose esters having such a very low degree of substitution. Yet, it was found that those tend to take place in the case of substitutions by the acetyl groups alone and do not apply to cellulose esters having substitutions by the acyl groups having 3 carbon atoms or more. That is, in the present invention, the cellulose esters have substitutions by acyl groups having 3 to 4 carbon atoms, or acyl groups having 2 carbon atoms and acyl groups having 3 to 4 carbon atoms.

In accordance with the present invention, as long as the above requirements are sufficed, the cellulose esters can have the following acyl groups, which may be aliphatic groups or aryl groups, and are not particularly restricted. Examples thereof are alkylcarbonyl esters of cellulose, alkenylcarbonyl esters of cellulose, or aromatic carbonyl esters of cellulose, aromatic alkylcarbonyl esters of cellulose or the like. Each of them may further have substituted groups.

Examples of preferred acyl groups include acetyl group, propionyl group, butanoyl group, heptanoyl group, hexanoyl group, octanoyl group, decanoyl group, dodecanoyl group, tridecanoyl group, tetradecanoyl group, hexadecanoyl group, octadecanoyl group, isobutanoyl group, tert-butanoyl group, cyclohezane carbonyl group, oleoyl group, benzoyl group, naphthyl carbonyl group, and cinnamoyl group. Of these, more preferred is acetyl group, propionyl group, butanoyl group, dodecanoyl group, octadecanoyl group, tert-butanoyl group, oleoyl group, benzoyl group, naphthyl carbonyl group, cinnamoyl group or the like. An acetyl group, propionyl group, or butanoyl group (cases where the acyl group has 2 to 4 carbon atoms) is particularly preferred.

In the acylation of cellulose, when acid anhydrides or acid chlorides are used as acylating agents, organic acids such as acetic acid or methylene chloride are used as organic solvents that are reaction solvents.

As catalysts, in cases where the acylating agent is acid anhydride, protic catalysts such as sulfuric acid are preferably employed and in cases where the acylating agent is acid chloride (for example, $CH_3CH_2COCl$), basic compounds are employed.

The weight average molecular weight (Mw) of the cellulose esters employed in the present invention is preferably in a range of 50,000 to 150,000. Further, those with a weight average molecular weight of 100,000 to 150,000 are preferably employed. Cellulose esters having such molecular weight were found to have, when formed into films, high transmittance.

A value of ratio of the weight average molecular weight (Mw) to number average molecular weight (Mn) of the cellulose ester Mw/Mn is preferably 1.4 to 3.0.

The number average molecular weight (Mn) and weight average molecular weight (Mw) of the cellulose ester were measured using gel permeation chromatography (GPC).

Conditions for the measurement were as follows:
Solvent: methylene chloride
Column: Shodex K806, K805, and K803G (three columns manufactured by Showa Denko K.K. were connected to be used.)
Column temperature: 25° C.
Sample concentration: 0.1% by mass
Detector: RI Model 504 (manufactured by GL Sciences Inc.)
Pump: L6000 (manufactured by Hitachi, Ltd.)
Flow rate: 1.0 ml/min
Calibration curve: A calibration curve by 13 samples of standard polystyrene STK standard polystyrene (manufactured by Tosoh Corporation) Mw=1000000 to 500 was used. The 13 samples were utilized at nearly equal interval.

The most common industrial synthesis method of cellulose esters of mixed fatty acids is a method comprising acylating cellulose with fatty acids corresponding to an acetyl group and other acyl groups (such as acetic acid, propionic acid, valeric acid) or mixed organic acid components containing acid anhydrides of those acids.

The cellulose ester employed in the present invention can be synthesized by, for example, a method described in Japanese Patent Application Laid-Open Publication No. 10-45804.

<Sugar Ester Compound>

In the present invention, "sugar ester compounds having not less than one and not more than 12 of sugar unit structures that are at least one of pyranose structure or furanose structure, wherein part or all of the hydroxyl groups in the sugar unit structure are esterified" is hereinafter simply called "sugar ester compounds."

In the sugar ester compound, the average percentage of substitution in the sugar unit structure is 35% to 75%. The average percentage of substitution is preferably 35% to 65%. In the present specification, "the average percentage of substitution in the sugar unit structure" represents a percentage of the hydroxyl groups substituted by substituent groups other than the hydroxyl group out of 3 to 5 hydroxyl groups of the sugar unit structure, that is, the pyranose structure or furanose structure. For example, glucose which has the pyranose structure has 4 hydroxyl groups, and when all of the hydroxyl groups of the glucose are substituted, the percentage of substitution is determined as 100%.

Examples of the sugar unit structure include erythrose, threose, lyxose, xylose, arabinose, ribose, glucose, galactose, mannose, fructose, gulose, idose, talose, altrose, and allose. Of these, erythrose, and threose have 3 hydroxyl groups in the unit structure thereof; lyxose, xylose, arabinose, and ribose have 4 hydroxyl groups in the unit structure thereof; and glucose, mannose, fructose, gulose, idose, galactose, talose, altrose, and allose have 5 hydroxyl groups in the unit structure thereof.

Examples of sugars used as synthetic raw materials when the above-mentioned sugar ester compounds are synthesized include, besides the above monosaccharides, lactose, sucrose, kestose, nystose, 1F-fructosyl nystose, stachyose, maltitol, lactitol, lactulose, cellobiose, maltose, cellotriose, maltotriose, raffinose, and kestose. Besides, examples thereof include gentiobiose, gentiotriose, gentiotetraose, xylotriose, and galactosyl sucrose. However, the sugars are not limited thereto.

As the sugar ester compound, compounds having both the pyranose structure and furanose structure are preferred among other things. By way of example, sucrose, kestose, nystose, 1F-fructosyl nystose, stachyose and the like are preferred. From the viewpoint of compatibility and volatility, sucrose is further preferred.

As monocarboxylic acids employed at the time of synthesis of sugar ester compounds according to the present invention, known aliphatic monocarboxylic acids, alicyclic monocarboxylic acids, aromatic monocarboxylic acids and the like can be employed. One type of the carboxylic acids may be employed or a mixture of two or more types may be employed.

Examples of preferred aliphatic monocarboxylic acids include saturated fatty acids such as acetic acid, propionic acid, butyric acid, isobutyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, or lacceric acid; and unsaturated fatty acids such as undecylenic acid, oleic acid, sorbic acid, linoleic acid, linolenic acid, arachidonic acid, or octenoic acid.

Examples of preferred alicyclic monocarboxylic acids include cyclopentanecarboxylic acid, cyclohexanecarboxylic acid, cyclooctanecarboxylic acid, and derivatives thereof.

Examples of preferred aromatic monocarboxylic acids include benzoic acid; phenylacetic acid; aromatic monocarboxylic acids in which 1 to 5 alkyl groups or alkoxy groups are introduced to the benzene ring of benzoic acid such as toluic acid; cinnamic acid; aromatic monocarboxylic acids having 2 benzene rings or more such as benzilic acid, biphenyl carboxylic acid, naphthalene carboxylic acid, or tetralin carboxylic acid; and derivatives thereof. Benzoic acid is in particular preferred.

By way of one example of desired sugar ester compounds, the general formula (1) is shown below:

General Formula (1)

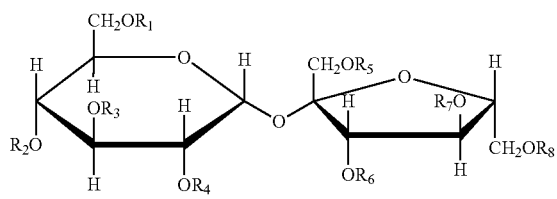

In the present invention, a degree of substitution of a compound represented by the general formula (1) represents the number of the hydroxyl groups substituted by substituent groups other than hydrogen out of 8 hydroxyl groups contained in a sucrose structure, that is, represents the number of the groups other than hydrogen out of $R_1$ to $R_8$ of the general formula (1). Accordingly, in cases where $R_1$ to $R_8$ are all substituted by the substituent groups other than hydrogen, the degree of substitution is determined as a maximum value of 8.0. In cases where $R_1$ to $R_8$ are all hydrogen atoms, the degree of substitution is determined as 0.0.

In accordance with the present invention, the degree of substitution of the compound represented by general formula (1) is preferably 2.8 to 6.0. In addition, it is further preferred to be 2.8 to 5.2. It is appropriate that the average degree of substitution is employed as "the degree of substitution of the general formula (1)" in the present invention. The average degree of substitution can be measured by an area ratio from a chart showing distribution of the degree of substitution by high performance liquid chromatography by the method below.

When retardation developing property is solely taken in to consideration, it is more preferred in the present invention that all of the hydroxyl groups of the sugar ester compound be esterified. Yet, in view of transmittance, volatility, mechanical strength, the degree of substitution of the present invention was found to be preferred.

Because the cellulose ester with a very low degree of substitution as described in the present invention has many residual hydroxyl groups, there is concern for water resistance when compared with existing cellulose esters with a high degree of substitution. Plasticizers may be added for improving the concern. Without compatibility being matched, they would end up volatilizing. In the light of the above, it was found that the above object was attained by adding sugar ester compounds that have a structure similar to cellulose esters and have the low degree of substitution. By adding the sugar ester compound that has a structure similar to cellulose esters and has the low degree of substitution, bleed out can be inhibited.

Further, because the cellulose ester with a very low degree of substitution is readily affected by moisture, shrinkage at the time when durability is tested is a major issue when the cellulose ester is made to a polarizing plate. In view of this, it was thought that effects of the shrinkage in the polarizing plate could be lessened by making the degree of substitution of the sugar ester compound smaller, leaving more hydroxyl groups, and softening suitably hydrogen bonds between the cellulose ester with a low degree of substitution and sugar ester compound.

Further, from the viewpoint of compatibility, the sugar ester compound is preferably a mixture of those with different degrees of substitution.

In the general formula (1), $R_1$ to $R_8$ represent a substituted or unsubstituted alkyl carbonyl group, or a substituted or unsubstituted aryl carbonyl group, that is, an acyl group. $R_1$ to $R_8$ may be same or may be different (hereinafter, $R_1$ to $R_8$ are referred to also as the acyl group). Specific examples of $R_1$ to $R_8$ include acyl groups derived from monocarboxylic acid employed at the time of synthesis of the sugar ester compounds, which acyl groups are exemplified above.

Part of the specific examples according to the present invention are shown below, these are cases where $R_1$ to $R_8$ are all the same substituent group R, but the present invention is not limited thereto and each of $R_1$ to $R_8$ may be a different group.

| Compound number | R | Average degree of substitution |
|---|---|---|
| 1-1 | —C(=O)—CH₃ | 3.3 |
| 1-2 | —C(=O)—CH₃ | 4.2 |
| 1-3 | —C(=O)—CH₃ | 5.7 |
| 1-4 | —C(=O)—CH₃ | 6.0 |
| 1-5 | —C(=O)—C₆H₅ | 3.5 |
| 1-6 | —C(=O)—C₆H₅ | 4.0 |
| 1-7 | —C(=O)—C₆H₅ | 5.5 |
| 1-8 | —C(=O)—C₆H₅ | 6.0 |

-continued

| Compound number | R | Average degree of substitution |
|---|---|---|
| 1-9 | —C(=O)—C6H4—CH3 (para) | 3.2 |
| 1-10 | —C(=O)—C6H4—CH3 (para) | 4.4 |
| 1-11 | —C(=O)—C6H4—CH3 (para) | 5.5 |
| 1-12 | —C(=O)—C6H4—CH3 (para) | 6.0 |
| 1-13 | —C(=O)—CH2—C6H5 | 3.0 |
| 1-14 | —C(=O)—CH2—C6H5 | 4.0 |
| 1-15 | —C(=O)—CH2—C6H5 | 5.5 |
| 1-16 | —C(=O)—CH2—C6H5 | 6.0 |
| 1-17 | —C(=O)—C6H2(OCH3)3 (3,4,5-trimethoxy) | 3.1 |
| 1-18 | —C(=O)—C6H2(OCH3)3 (3,4,5-trimethoxy) | 4.7 |

-continued

| Compound number | R | Average degree of substitution |
|---|---|---|
| 1-19 | —C(=O)—C6H2(OCH3)3 (3,4,5-trimethoxy) | 5.3 |
| 1-20 | —C(=O)—C6H2(OCH3)3 (3,4,5-trimethoxy) | 6.0 |
| 1-21 | —C(=O)—CH(CH3)2 | 3.5 |
| 1-22 | —C(=O)—CH(CH3)2 | 4.6 |
| 1-23 | —C(=O)—CH(CH3)2 | 5.6 |
| 1-24 | —C(=O)—CH(CH3)2 | 6.0 |

The sugar ester compound of the present invention can be produced by bringing a sugar compound into reaction with an acylating agent (referred to also as an esterifying agent, for example, acid halide such as acetyl chloride, and anhydride such as acetic anhydride). Distribution of esterification rates can be made by adjusting the amount of acylating agent added, timing of addition, esterification reaction time. An intended sugar ester compound can be produced by mixing sugar ester compounds with different esterification rates or mixing compounds with different esterification rates that are purely isolated.

(Example of Synthesis: Example of Synthesis of the Compound of the Present Invention)

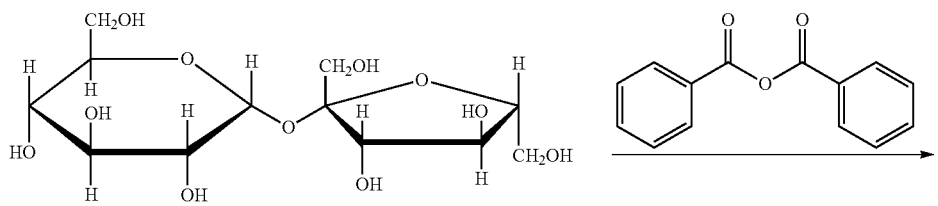

-continued

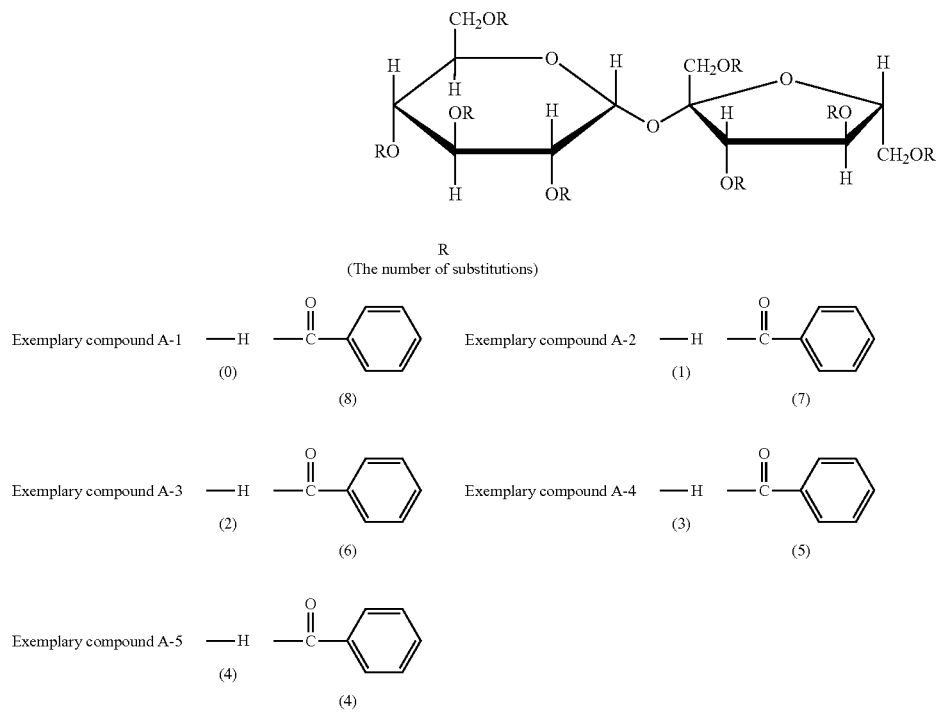

Sucrose 34.2 g (0.1 mol), benzoic anhydride 135.6 g (0.6 mol), pyridine 284.8 g (3.6 mol) were put in a four neck Kolben flask with a stirring device, reflux condenser, thermometer and nitrogen gas introduction tube. The temperature was increased under stirring while nitrogen gas was bubbling from the nitrogen gas introduction tube. An esterification reaction was carried out at 70° C. for 5 hours.

Next, the pressure in the Kolben flask was reduced to not more than $4 \times 10^2$ Pa and excess pyridine was distilled at 60° C. The pressure in the Kolben flask was then reduced to not more than $1.3 \times 10$ Pa and the temperature was increased to 120° C. to distill a majority of benzoic anhydride and benzoic acid generated. And then, toluene 1 L and 0.5% by mass sodium carbonate aqueous solution 300 g were added. The mixture was stirred at 50° C. for 30 minutes and allowed to stand, thereby fractionating a toluene layer. Lastly, the fractionated toluene layer was added with water 100 g and rinsed with water at normal temperature for 30 minutes. The toluene layer was fractionated and toluene was distilled under reduced pressure (not more than $4 \times 10^2$ Pa) at 60° C., thereby obtaining sugar ester compound 1 which is a mixture of compounds A-1, A-2, A-3, A-4, A-5 and the like.

When the obtained mixture was analyzed by high performance liquid chromatography-mass spectrometry (HPLC-MS), A-1 accounted for 1.2% by mass; A-2 accounted for 13.2% by mass; A-3 accounted for 14.2% by mass; A-4 accounted for 35.4% by mass; and A-5 and the like accounted for 40.0% by mass. The average degree of substitution was 5.2.

Similarly, 158.2 g (0.7 mol), 146.9 g (0.65 mol), and 124.3 g (0.55 mol) of benzoic anhydride were reacted with an equivalent mole of pyridine to obtain sugar esters with components as described in Table 1.

TABLE 1

| Components | Number of moles of benzoic anhydride | | | |
|---|---|---|---|---|
| (% by mass) | 0.70 | 0.65 | 0.60 | 0.55 |
| A-1 | 7.3 | 2.3 | 1.2 | 0.5 |
| A-2 | 28.4 | 18.8 | 13.2 | 7.0 |
| A-3 | 29.0 | 17.8 | 14.2 | 9.4 |
| A-4 | 26.4 | 34.0 | 35.4 | 26.5 |
| A-5 and the like | 8.8 | 27.1 | 40.0 | 56.7 |
| Average degree of substitution | 6.0 | 5.4 | 5.2 | 4.7 |

Subsequently, part of the obtained mixture was purified by column chromatography using silica gel, thereby obtaining A-1, A-2, A-3, A-4, A-5 and the like, each of which had 100% purity.

Note that A-5 and the like mean all components that have a degree of substitution of 4 or less, that is, a mixture of compounds that have a degree of substitution of 4, 3, 2, and 1. In addition, the average degree of substitution was calculated assuming the degree of substitution of A-5 and the like was 4.

In accordance with the present invention, by the method produced here, the average degree of substitution was adjusted by combining and adding sugar esters and isolated A-1 to A-5 and the like which have the average degree of substitution close to the desired one.

<Conditions for Measurement for HPLC-MS>
1) LC Part

Device: column oven (JASCO CO-965), detector (JASCO UV-970-240 nm), pump (JASCO PU-980), degasser (JASCO DG-980-50), all of which are manufactured by JASCO Corporation.

Column: Inertsil ODS-3 particle size 5 μm 4.6×250 mm (manufactured by GL Sciences Inc.)

Column temperature: 40° C.
Flow rate: 1 ml/min
Mobile phase: THF (1% acetic acid):$H_2O$ (50:50)
Injection volume: 3 μl
2) MS Part
Device: LCQ DECA (manufactured by Thermo Quest)
Ionization method: electrospray ionization (ESI) method
Spray Voltage: 5 kV
Capillary temperature: 180° C.
Vaporizer temperature: 450° C.
<Additives>

In the present invention, besides sugar ester compounds, additives such as plasticizers, retardation regulators (retardation developers or retardation reducing agents), UV absorbers, antioxidants, release accelerants, or matting agents can be added.

<Retardation Regulator>

Retardation regulators are not particularly restricted. In cases where additives such as plasticizers, UV absorbers, antioxidants, or matting agents are also employed as the retardation regulators, these additives are included in the retardation regulators according to the present invention.

(Retardation Developer)

In the present invention, for developing retardation values, the retardation developers include those comprising rod-like or disk-shaped compounds. As the above rod-like or disk-shaped compound, compounds having at least two aromatic rings can be employed as the retardation developer.

The amount of the retardation developer comprising the rod-like compound added is, based on 100 parts by mass of polymer (cellulose ester) component containing cellulose acylate, preferably 0.1 to 30 parts by mass and further preferably 0.5 to 20 parts by mass. The disk-shaped retardation developer is, based on 100 parts by mass of the above-mentioned polymer component containing cellulose acylate, is preferably used in a range of 0.05 to 20 parts by mass, more preferably used in a range of 1.0 to 15 parts by mass and still more preferably in a range of 3.0 to 10 parts by mass.

Because the disk-shaped compound is superior to the rod-like compound in terms of Rt retardation development property, it is preferably used particularly in cases where high Rt retardation is required. Two or more types of the retardation developers may be used in combination.

The retardation developer preferably has the maximum absorption in a wavelength region of 250 to 400 nm and preferably does not substantially have absorption in the visible region.

The disk-shaped compound will now be described. As the disk-shaped compounds, compounds having at least two aromatic rings can be used.

In the present specification, "aromatic rings" includes aromatic heterocyclic rings in addition to aromatic hydrocarbon rings.

The aromatic hydrocarbon ring is in particular preferably six-membered rings (that is, benzene rings).

The aromatic heterocyclic ring is in general an unsaturated heterocyclic ring. The aromatic heterocyclic ring is preferably a five-membered ring, six-membered ring or seven-membered ring and further preferably a five-membered ring or six-membered ring. The aromatic heterocyclic ring generally has the largest number of double bonds. As the hetero atom, a nitrogen atom, oxygen atom or sulfur atom is preferred with a nitrogen atom being particularly preferred. Examples of the aromatic heterocyclic ring include furan ring, thiophene ring, pyrrole ring, oxazole ring, isoxazole ring, thiazole ring, isothiazole ring, imidazole ring, pyrazole ring, furazan ring, triazole ring, pyran ring, pyridine ring, pyridazine ring, pyrimidine ring, pyrazine ring and 1,3,5-triazine ring.

The aromatic ring is preferably benzene ring, fused benzene ring, or biphenyls. In particular, 1,3,5-triazine ring is preferably employed. To be specific, a compound disclosed in, for example, Japanese Patent Application Laid-Open Publication No. 2001-166144 is preferably employed.

The number of carbon atoms of the aromatic ring that the retardation developer has is preferably 2 to 20, more preferably 2 to 12, still more preferably 2 to 8, and most preferably 2 to 6.

The linkage relationship of the two aromatic rings can be classified into (a) cases where fused rings are formed, (b) cases where the rings are directly linked by single bonds and (c) cases where the rings are linked via linking groups (because of being the aromatic ring, spiro linkages cannot be formed.)

The linkage relationship may be any of (a) to (c).

Examples of the fused rings (fused rings of two or more aromatic rings) in (a) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolizine ring, benzoxazole ring, benzothiazole ring, benzimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxathiin ring, phenoxazine ring and thianthrene ring. Preferred is naphthalene ring, azulene ring, indole ring, benzoxazole ring, benzothiazole ring, benzimidazole ring, benzotriazole ring or quinoline ring.

The single bond in (b) is preferably a linkage between carbon atoms of the two aromatic rings. The two aromatic rings may linked by two or more single bonds to form an aliphatic ring or non-aromatic heterocyclic ring between the two aromatic rings.

The linking group in (c) preferably links to carbon atoms of the two aromatic rings as well. The linking group is preferably alkylene group, alkenylene group, alkynylene group, —CO—, —O—, —NH—, —S— or a combination thereof. Examples of the linking group comprising the combination are shown below. Note that the left-to-right relationship in the following examples of the linking group may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and linking group may have substituent groups.

Examples of the substituent group include halogen atoms (F, Cl, Br, and I), hydroxyl group, carboxyl group, cyano group, amino group, nitro group, sulfo group, carbamoyl group, sulfamoyl group, ureido group, alkyl group, alkenyl group, alkynyl group, aliphatic acyl group, aliphatic acyloxy group, alkoxy group, alkoxycarbonyl group, alkoxycarbonylamino group, alkylthio group, alkylsulfonyl group, aliphatic amide group, aliphatic sulfonamide group, aliphatic substituted amino group, aliphatic substituted carbamoyl group, aliphatic substituted sulfamoyl group, aliphatic substituted ureido group and non-aromatic heterocyclic group.

The number of carbon atoms of the alkyl group is preferably 1 to 8. Chain alkyl groups are more preferred than cyclic alkyl groups and linear alkyl groups are in particular preferred. The alkyl group may further have substituent groups (for examples, hydroxy group, carboxy group, alkoxy group, and alkyl substituted amino group). Examples of the alkyl group (including the substituted alkyl group) include each group of methyl group, ethyl group, n-butyl group, n-hexyl group, 2-hydroxyethyl group, 4-carboxybutyl group, 2-methoxyethyl group and diethylaminoethyl group.

The number of carbon atoms of the alkenyl group is preferably 2 to 8. Chain alkenyl groups are more preferred than cyclic alkenyl groups and linear alkenyl groups are in particular preferred. The alkenyl group may further have substituent groups. Examples of the alkenyl group include vinyl group, allyl group and 1-hexenyl group.

The number of carbon atoms of the alkynyl group is preferably 2 to 8. Chain alkynyl groups are more preferred than cyclic alkynyl groups and linear alkynyl groups are in particular preferred. The alkynyl group may further have substituent groups. Examples of the alkynyl group include ethynyl group, 1-butynyl group and 1-hexynyl group.

The number of carbon atoms of the aliphatic acyl group is preferably 1 to 10. Examples of the aliphatic acyl group include acetyl group, propanoyl group and butanoyl group.

The number of carbon atoms of the aliphatic acyloxy group is preferably 1 to 10. Examples of the aliphatic acyloxy group include acetoxy group.

The number of carbon atoms of the alkoxy group is preferably 1 to 8. The alkoxy group may further have substituent groups (for example, alkoxy group). Examples of the alkoxy group (including substituted alkoxy group) include methoxy group, ethoxy group, butoxy group and methoxyethoxy group.

The number of carbon atoms of the alkoxycarbonyl group is preferably 2 to 10. Examples of the alkoxycarbonyl group include methoxycarbonyl group and ethoxycarbonyl group.

The number of carbon atoms of the alkoxycarbonylamino group is preferably 2 to 10. Examples of the alkoxycarbonylamino group include methoxycarbonyl amino group and ethoxycarbonyl amino group.

The number of carbon atoms of the alkylthio group is preferably 1 to 12. Examples of the alkylthio group include methylthio group, ethylthio group and octylthio group.

The number of carbon atoms of the alkylsulfonyl group is preferably 1 to 8. Examples of the alkylsulfonyl group include methanesulfonyl group and ethanesulfonyl group.

The number of carbon atoms of the aliphatic amide group is preferably 1 to 10. Examples of the aliphatic amide group include acetamide.

The number of carbon atoms of the aliphatic sulfonamide group is preferably 1 to 8. Examples of the aliphatic sulfonamide group include methanesulfonamide group, butanesulfonamide group and n-octanesulfonamide group.

The number of carbon atoms of the aliphatic substituted amino group is preferably 1 to 10. Examples of the aliphatic substituted amino group include dimethylamino group, diethylamino group and 2-carboxyethyl amino group.

The number of carbon atoms of the aliphatic substituted carbamoyl group is preferably 2 to 10. Examples of the aliphatic substituted carbamoyl group include methylcarbamoyl group and diethylcarbamoyl group.

The number of carbon atoms of the aliphatic substituted sulfamoyl group is preferably 1 to 8. Examples of the aliphatic substituted sulfamoyl group include methylsulfamoyl group and diethylsulfamoyl group.

The number of carbon atoms of the aliphatic substituted ureido group is preferably 2 to 10. Examples of the aliphatic substituted ureido group include methylureido group.

Examples of the non-aromatic heterocyclic group include piperidino group and morpholino group.

The molecular weight of the retardation developer is preferably 300 to 800.

It preferred that a triazine compound represented by the following general formula (I) be employed as the disk-shaped compound.

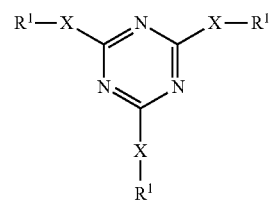

General Formula (I)

In the above general formula (I): each of $R^1$s independently represents an aromatic ring or heterocyclic ring having a substituent group at least at any of ortho position, meta position and para position.

Each of Xs independently represents a single bond or $NR^2$—. Here, each of $R^2$s independently represents a hydrogen atom, or substituted or unsubstituted alkyl group, alkenyl group, aryl group or heterocyclic group.

The aromatic ring that $R^1$ represents is preferably phenyl or naphthyl with phenyl being in particular preferred. The aromatic ring that $R^1$ represents may also have at least one substituent group at any of substitution positions. Examples of the above-mentioned substituent group include halogen atoms, hydroxyl group, cyano group, nitro group, carboxyl group, alkyl group, alkenyl group, aryl group, alkoxy group, alkenyloxy group, aryloxy group, acyloxy group, alkoxycarbonyl group, alkenyloxycarbonyl group, aryloxycarbonyl group, sulfamoyl group, alkyl substituted sulfamoyl group, alkenyl substituted sulfamoyl group, aryl substituted sulfamoyl group, sulfonamide group, carbamoyl, alkyl substituted carbamoyl group, alkenyl substituted carbamoyl group, aryl substituted carbamoyl group, amide group, alkylthio group, alkenylthio group, arylthio group and acyl group.

The heterocyclic group that $R^1$ represents preferably has aromaticity. Heterocyclic rings having aromaticity are in general unsaturated heterocyclic rings. Preferred is a heterocyclic ring having the largest number of double bonds. The heterocyclic ring is preferably a five-membered ring, six-membered ring or seven-membered ring, further preferably a five-membered ring or six-membered ring and most preferably a six-membered ring. The hetero atom in the heterocyclic ring is a nitrogen atom, sulfur atom or oxygen atom with nitrogen atom being in particular preferred. As the heterocyclic ring having aromaticity, pyridine ring (2-pyridyl or 4-pyridyl as a heterocyclic group) is in particular preferred. The heterocyclic group may have substituent groups. Examples of substituent groups of the heterocyclic group are same as the above examples of the substituent group of the aryl moiety.

A heterocyclic group in the case of X being a single bond, is preferably a heterocyclic group in which a nitrogen atom has free valence. The heterocyclic group in which a nitrogen atom has free valence is preferably a five-membered ring, six-membered ring or seven-membered ring, more preferably a five-membered ring or six-membered ring and most preferably a five-membered ring. The heterocyclic group may have plural nitrogen atoms. In addition, the heterocyclic group may have hetero atoms other than nitrogen atom (for example, O, or S). Examples of the heterocyclic group in which the nitrogen atom has free valence will be shown below. Here, —$C_4H_9$n represents n-$C_4H_9$.

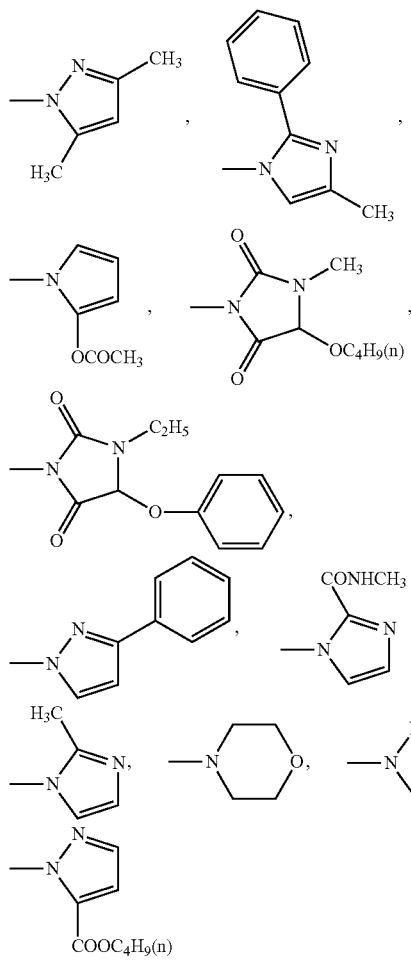

The alkyl group that $R^2$ represents may be a cyclic alkyl group or may be a chain alkyl group. The chain alkyl group is preferred and a linear alkyl group is more preferred than a chain alkyl group having branches. The number of carbon atoms of the alkyl group is preferably 1 to 30, more preferably 1 to 20, still more preferably 1 to 10, still further more preferably 1 to 8 and most preferably 1 to 6. The alkyl group may have substituent groups. Examples of the substituent group include halogen atoms, alkoxy group (for example, methoxy group and ethoxy group) and acyloxy group (for example, acryloyloxy group, and methacryloyloxy group).

The alkenyl group that $R^2$ represents may be a cyclic alkenyl group or may be a chain alkenyl group. The chain alkenyl group is preferred and a linear alkenyl group is more preferred than a chain alkenyl group having branches. The number of carbon atoms of the alkenyl group is preferably 2 to 30, more preferably 2 to 20, still more preferably 2 to 10, still furthermore preferably 2 to 8 and most preferably 2 to 6. The alkenyl group may have substituent groups. Examples of the substituent group are same as those of the substituent group of the above-mentioned alkyl group.

The aromatic ring group and heterocyclic group that $R^2$ represents is same as the aromatic ring and heterocyclic ring that $R^1$ represents. The same is applied to the preferred range. The aromatic ring group and heterocyclic group may further have substituent groups. Examples of the substituent group are same as those of the substituent group of aromatic ring and heterocyclic ring of $R^1$.

Specific examples of the compound represented by the general formula (I) include the following but are not limited thereto.

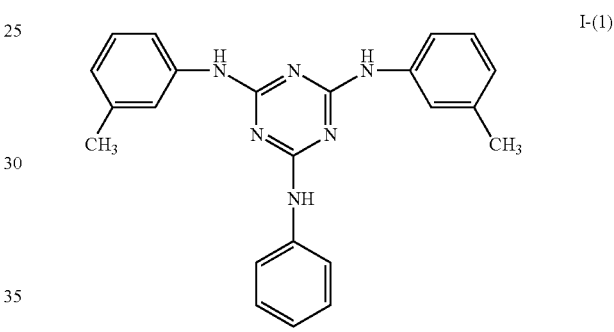

I-(1)

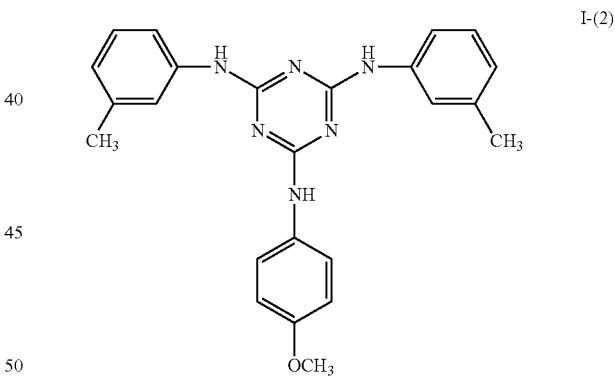

I-(2)

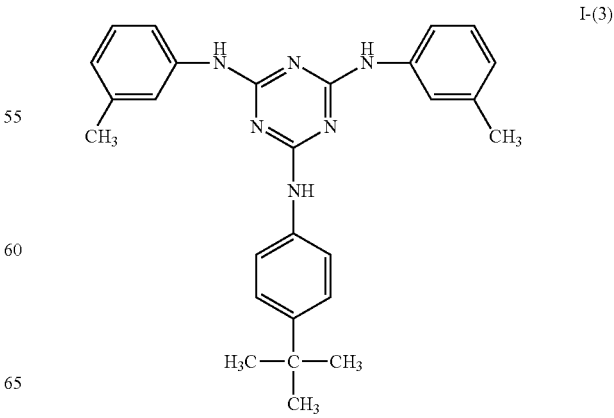

I-(3)

I-(4)
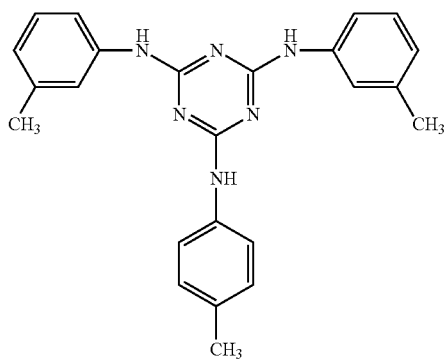

I-(5)
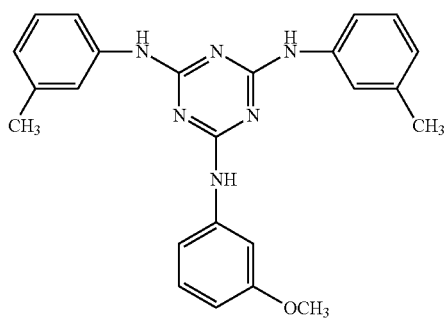

I-(6)
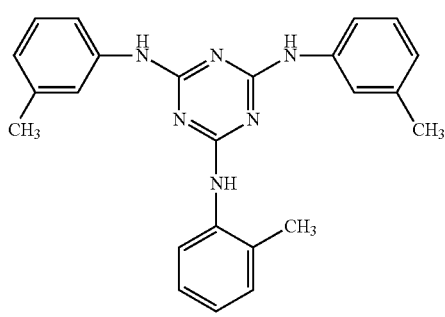

I-(7)
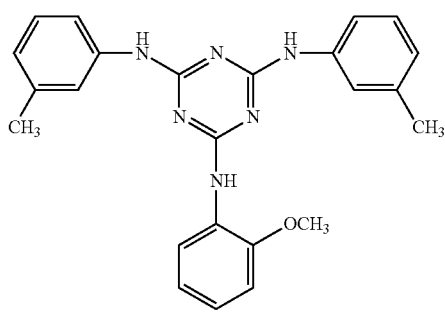

I-(8)
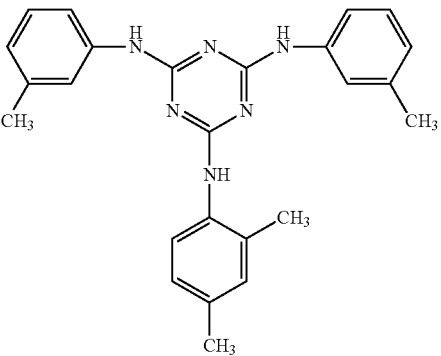

Synthesis can be carried out by known methods as exemplified by a method described in Japanese Patent Application Laid-Open Publication No. 2003-344655 for the compound represented by the general formula (I) and a method described in Japanese Patent Application Laid-Open Publication No. 2005-134884 for the compound represented by the general formula (II).

In the present invention, besides the above-mentioned disk-shaped compound, rod-like compounds which have a linear molecular structure can be preferably used. The linear molecular structure means that the molecular structure of the rod-like compound is linear in the most thermodynamically stable structure thereof. The most thermodynamically stable structure can be determined by crystal, structure analysis or molecular orbital calculation. For example, the molecular orbital calculation is carried out using molecular orbital calculation software (for example, WinMOPAC2000, manufactured by Fujitsu Limited) to determine the structure of molecule to make the heat of formation of the compound lowest. The phrase "the molecular structure is linear" means in the most thermodynamically stable structure calculated as described above, an angle composed of the main chain is 140 degrees or more in the molecular structure.

The rod-like compound having at least two aromatic rings is preferably a compound represented by the following general formula (11)

$$Ar_1\text{-}L_1\text{-}Ar_2 \qquad \text{The general formula (11):}$$

In the above general formula (11), each of $Ar_1$ and $Ar_2$ is independently an aromatic group.

In the present specification, the aromatic group includes an aryl group (aromatic hydrocarbon group), substituted aryl group, aromatic heterocyclic group and substituted aromatic heterocyclic group.

The aryl group and substituted aryl group are more preferred than the aromatic heterocyclic group and substituted aromatic heterocyclic group. The heterocyclic ring of the aromatic heterocyclic group is generally unsaturated. The aromatic heterocyclic ring is preferably a five-membered ring, six-membered ring or seven-membered ring and further preferably a five-membered ring or six-membered ring. The aromatic heterocyclic ring generally has the largest number of double bonds. As the hetero atom, a nitrogen atom, oxygen atom or sulfur atom is preferred with a nitrogen atom or sulfur atom being particularly preferred.

As the aromatic ring of the aromatic group, benzene ring, furan ring, thiophene ring, pyrrole ring, oxazole ring, thiazole ring, imidazole ring, triazole ring, pyridine ring, pyrimidine ring or pyrazine ring is preferred with benzene ring being in particular preferred.

Examples of substituent groups of the substituted aryl group and substituted aromatic heterocyclic group include, halogen atoms (F, Cl, Br, and I), hydroxyl group, carboxyl group, cyano group, amino group, alkylamino group (for example, each of the groups of methylamino group, ethylamino group, butylamino group, and dimethylamino group), nitro group, sulfo group, carbamoyl group, alkylcarbamoyl group (for example, each of the groups of N-methylcarbamoyl group, N-ethylcarbamoyl group, and N,N-dimethylcarbamoyl group), sulfamoyl group, alkylsulfamoyl group (for example, each of the groups of N-methylsulfamoyl group, N-ethylsulfamoyl group, and N,N-dimethysulfamoyl group), ureido group, alkylureido group (for example, each of the groups of N-methylureido group, N,N-dimethylureido group, and N,N,N'-trimethylureido group), alkyl group (for example, each of the groups of methyl group, ethyl group, propyl group, butyl group, pentyl group, heptyl group, octyl group, isopropyl group, s-butyl group, tert-amyl group, cyclohexyl group, and cyclopentyl group), alkenyl group (for example, each of the groups of vinyl group, allyl group, and hexenyl group), alkynyl group (for example, each of the groups of ethynyl group, and butynyl group), acyl group (for example, each of the groups of formyl group, acetyl group, butyryl group, hexanoyl group, and lauryl group), acyloxy group (for example, each of the groups of acetoxy group, butyryloxy group, hexanoyloxy group, and lauryloxy group), alkoxy group (for example, each of the groups of methoxy group, ethoxy group, propoxy group, butoxy group, pentyloxy group, heptyloxy group, and octyloxy group), aryloxy group (for example, phenoxy group), alkoxycarbonyl group (for example, each of the groups of methoxycarbonyl group, ethoxycarbonyl group, propoxycarbonyl group, butoxycarbonyl group, pentyloxycarbonyl group, and heptyloxycarbonyl group), aryloxycarbonyl group (for example, phenoxycarbonyl group), alkoxycarbonylamino group (for example, butoxycarbonylamino group and hexyloxycarbonylamino group), alkylthio group (for example, each of the groups of methylthio group, ethylthio group, propylthio group, butylthio group, pentylthio group, heptylthio group, and octylthio group), arylthio group (for example, phenylthio group), alkylsulfonyl group (for example, each of the groups of methyl sulfonyl group, ethylsulfonyl group, propylsulfonyl group, butylsulfonyl group, pentylsulfonyl group, heptylsulfonyl group, and octylsulfonyl group), amide group (for example, each of the groups of acetamido group, butylamide group, hexylamide group, and laurylamide group) and non-aromatic heterocyclic group (for example, morpholyl group and pyrazinyl group).

Of these, examples of preferred substituent groups include halogen atoms, cyano group, carboxyl group, hydroxyl group, amino group, alkylamino group, acyl group, acyloxy group, amide group, alkoxycarbonyl group, alkoxy group, alkylthio group and alkyl group.

The alkyl moiety and alkyl group of the alkylamino group, alkoxycarbonyl group, alkoxy group and alkylthio group may further have substituent groups. Examples of the substituent group of the alkyl moiety and alkyl group include halogen atoms, hydroxyl group, carboxyl group, cyano group, amino group, alkylamino group, nitro group, sulfo group, carbamoyl group, alkylcarbamoyl group, sulfamoyl group, alkylsulfamoyl group, ureido group, alkylureido group, alkenyl group, alkynyl group, acyl group, acyloxy group, alkoxy group, aryloxy group, alkoxycarbonyl group, aryloxycarbonyl group, alkoxycarbonylamino group, alkylthio group, arylthio group, alkylsulfonyl group, amide group and non-aromatic heterocyclic group. As the substituent group of the alkyl moiety and alkyl group, halogen atoms, hydroxyl group, amino group, alkylamino group, acyl group, acyloxy group, acylamino group, alkoxycarbonyl group and alkoxy group are preferred.

In the general formula (11), L1 is a divalent linking group selected from an alkylene group, alkenylene group, alkynylene group, —O—, —CO— and a group comprising a combination thereof.

The alkylene group may have a cyclic structure. As a cyclic alkylene group, cyclohexylene is preferred and 1,4-cyclohexylene is in particular preferred. As a chain alkylene group, a linear alkylene group is more preferred than an alkylene group having branches.

The number of carbon atoms of the alkylene group is preferably 1 to 20, more preferably 1 to 15, still more preferably 1 to 10, still further more preferably 1 to 8 and most preferably 1 to 6.

The alkenylene group and alkynylene group preferably have a chain structure rather than a cyclic structure and further preferably have a linear structure rather than a chain structure having branches.

The number of carbon atoms of the alkenylene group and alkynylene group is preferably 2 to 10, more preferably 2 to 8, still more preferably 2 to 6, still further more preferably 2 to 4 and most preferably 2 (vinylene group and ethynylene group).

The number of carbon atoms of the arylene group is preferably 6 to 20, more preferably 6 to 36, and still more preferably 6 to 12.

In the molecular structure of the general formula (11), an angle formed by $Ar_1$ and $Ar_2$ that face each other across $L_1$ is preferably 140 degrees or more.

As a rod-like compound, preferred is a compound represented by the formula below, the general formula (12).

$Ar_1$-$L_2$-X-$L_3$-Ar    The general formula (12):

In the above general formula (12), each of $Ar_1$ and $Ar_2$ is independently an aromatic group. The definition and examples of the aromatic group are same as those of $Ar_1$ and $Ar_2$ of the general formula (12).

In the general formula (12), each of $L_2$ and $L_3$ is independently a divalent linking group selected from an alkylene group, —O—, —CO— and a group comprising a combination thereof.

The alkylene group preferably has a chain structure rather than a cyclic structure and further preferably has a linear structure rather than a chain structure having branches.

The number of carbon atoms of the alkylene group is preferably 1 to 10, more preferably 1 to 8, still more preferably 1 to 6, still further more preferably 1 to 4 and most preferably 1 or 2 (methylene group or ethylene group).

$L_2$ and $L_3$ are in particular preferably —O—CO— or CO—O—.

In the general formula (12), X is a 1,4-cyclohexylene group, vinylene group or ethynylene group.

Specific examples of compounds represented by the general formula (11) or (12) include compounds described in the formulae [1] to [11] of Japanese Patent Application Laid-Open Publication No. 2004-109657.

Two or more types of rod-like compounds in which the maximum absorption wavelength (λmax) is a wavelength longer than 250 nm in ultraviolet absorption spectra of solution thereof may be used in combination.

The rod-like compound can be synthesized in reference to methods described in documents. Examples of the document include Mol. Cryst. Liq. Cryst., volume 53, page 229 (1.979), volume 89, page 93 (1982), volume 145, page 111 (1987), volume 170, page 43 (1989); J. Am. Chem. Soc., volume 113, page 1349 (1991), volume 118, page 5346 (1996), volume 92, page 1582 (1970); J. Org. Chem., volume 40, page 420 (1.975); and Tetrahedron, volume 48 issue 16, page 3437 (1992).

Further, a rod-like aromatic compound described in pages 11 to 14 of Japanese Patent Application Laid-Open Publication No. 2004-50516 may be employed as the above-mentioned retardation developer.

Further, as the retardation developer, one type of the compound can be solely employed or two or more types of the compounds can be mixed to be employed use. Use, as the retardation developers, of two or more compounds that are mutually different is preferred because an adjustment range of retardation can be widened and the retardation can be readily adjusted in a desired range.

The amount of the above-mentioned retardation developer added is, based on 100 parts by mass of cellulose acylate, preferably 0.1 to 20% by mass and further preferably 0.5 to 10% by mass. In cases where the above-mentioned cellulose acylate film is produced by the solvent casting method, the above-mentioned retardation developer may be added in dope. The addition may be carried out at any timing. For example, the retardation developer may be added into a cellulose acylate solution (dope) after dissolved in an organic solvent such as alcohol, methylene chloride, or dioxolane. Or the retardation developer may be directly added into a dope composition.

In particular, the percentage of the above disk-shaped compound is, based on the total mass of the disk-shaped compound and rod-like compound, preferably 0.1 to 20%, more preferably 0.5 to 15%, and in particular preferably 1 to 10%.

As the retardation developer according to the present invention, polymer-based additives cart be used as well as the above-mentioned can be used as well as the above-mentioned low-molecular compounds. The polymer additive is selected from polyester-based polymer, styrene-based polymer and acrylic polymers and copolymers of these and the like, and aromatic polyester is preferred.

Aromatic polyester based polymers can be obtained by copolymerizing monomers having aromatic rings to the above-mentioned polyester polymer. The monomer having aromatic rings is at least one type of monomer selected from aromatic dicarboxylic acid having 8 to 20 carbon atoms and aromatic diol having 6 to 20 carbon atoms.

The aromatic dicarboxylic acid having 8 to 20 carbon atoms is phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, 2,6-naphthalenedicarboxylic acid and the like. Of these, preferred aromatic dicarboxylic acid is phthalic acid, terephthalic acid, or isophthalic acid. Each of these can be used solely or two or more of these can be mixed to be used.

The aromatic diol having 6 to 20 carbon atoms not particularly restricted and examples thereof include bisphenol A, 1,2-hydroxybenzene, 1,3-hydroxybenzene, 1,4-hydroxybenzene, and 1,4-benzenedimethanol. Preferred is bisphenol A, 1,4-hydroxybenzene, or 1,4-benzenedimethanol. Each of these can be used solely or two or more of these can be mixed to be used.

Examples of dicarboxylic acids that may compose the aromatic polyester-based polymer other than the above aromatic dicarboxylic acid include succinic acid and adipic acid. Each of these can be used solely or two or more of these can be mixed to be used.

Examples of diols that may compose the aromatic polyester-based polymer other than the above aromatic diol include alkylene glycols such as ethylene glycol, diethylene glycol, 1,2-propylene glycol, or 2-methyl1,3-propanediol. Each of these can be used solely or two or more of these can be mixed to be used.

The end of the polyester may be sealed by an alkyl group or aromatic group. Or the hydroxyl group may be left unreacted.

The polyester-based polymer used in the present invention is described below but the present invention is not limited thereto. In the tables, n represents the number of repetitions.

TABLE 2

| Compound number | Acid | Glycol | Terminus | n |
|---|---|---|---|---|
| B-1 | phthalic acid | PG | benzoic acid | 2 |
| B-2 | adipic acid | DEG | benzoic acid | 2 |
| B-3 | isophthalic acid | DPG | benzoic acid | 2 |
| B-4 | phthalic acid | PG | benzoic acid | 3 |
| B-5 | terephthalic acid | EG | benzoic acid | 1 |
| B-6 | terephthalic acid | EG | o-toluic acid | 3 |
| B-7 | isophthalic acid | DEG | benzoic acid | 4 |
| B-8 | terephthalic acid | DEG | benzoic acid | 5 |
| B-9 | adipic acid | DEG | benzoic acid | 5 |
| B-10 | 2,6-naphthalenedicarboxylic acid | PG | o-toluic acid | 2 |
| B-11 | phthalic acid | PG | benzoic acid | 5 |
| B-12 | phthalic acid | PG | benzoic acid | 7 |
| B-13 | terephthalic acid | PG | benzoic acid | 2 |
| B-14 | terephthalic acid | PG | p-toluic acid | 2 |
| B-15 | terephthalic acid | PG | Mesitylenic acid | 2 |
| B-16 | terephthalic acid | PG | benzoic acid | 3 |
| B-17 | terephthalic acid | PG | p-toluic acid | 3 |
| B-18 | 2,3-naphthalenedicarboxylic acid | PG | benzoic acid | 2 |
| B-19 | terephthalic acid | PG | naphthyl acid | 3 |
| B-20 | terephthalic acid | PG | o-methoxybenzoic acid | 3 |
| B-21 | 2,6-naphthalenedicarboxylic acid | PG | OH | 1 |
| B-22 | 2,6-naphthalenedicarboxylic acid | PG | OH | 2 |
| B-23 | 2,6-naphthalenedicarboxylic acid | PG | OH | 3 |
| B-24 | 2,2-biphenyldicarboxylic acid | PG | OH | 1 |
| B-25 | 2,2-biphenyldicarboxylic acid | PG | OH | 2 |
| B-26 | 2,2-biphenyldicarboxylic acid | PG | OH | 3 |
| B-27 | 2,6-anthracenedicarboxylic acid | PG | OH | 1 |
| B-28 | 2,6-anthracenedicarboxylic acid | PG | OH | 2 |
| B-29 | 2,6-naphthalenedicarboxylic acid | PG/EG | OH | 1 |
| B-30 | 2,6-naphthalenedicarboxylic acid | PG/EG | OH | 2 |
| B-31 | 2,6-naphthalenedicarboxylic acid | DEG | OH | 1 |
| B-32 | 2,6-naphthalenedicarboxylic acid | DEG | OH | 2 |
| B-33 | 2,6-naphthalenedicarboxylic acid | PG | acetic acid | 1 |
| B-34 | 2,6-naphthalenedicarboxylic acid | PG | acetic acid | 2 |
| B-35 | 2,6-naphthalenedicarboxylic acid | PG | p-toluic acid | 1 |
| B-36 | 2,6-naphthalenedicarboxylic acid | PG | p-toluic acid | 2 |

TABLE 3

| Compound number | Acid | Glycol | Terminus | n |
|---|---|---|---|---|
| B-37 | terephthalic acid | PG | benzoic acid | 1 |
| B-38 | terephthalic acid | PG | p-toluic acid | 1 |
| B-39 | isophthalic acid | DPG | benzoic acid | 2 |
| B-40 | phthalic acid | PG | acetic acid | 2 |
| B-41 | terephthalic acid | PG | acetic acid | 1 |
| B-42 | 2,2-dimethyl, 4,4-biphenyldicarboxylic acid | Gly | acetic acid | 3 |
| B-43 | isophthalic acid | DEG | acetic acid | 4 |
| B-44 | terephthalic acid | DEG | OH | 4 |
| B-45 | adipic acid | DEG | acetic acid | 5 |
| B-46 | 2,6-naphthalenedicarboxylic acid | PG | benzoic acid | 1 |
| B-47 | phthalic acid | PG | acetic acid | 5 |
| B-48 | phthalic acid | PG | OH | 7 |
| B-49 | terephthalic acid | PG | OH | 2 |
| B-50 | terephthalic acid/succinic acid | PG | p-toluic acid | 2 |
| B-51 | terephthalic acid/succinic acid | PG | Mesitylenic acid | 2 |
| B-52 | terephthalic acid/succinic acid | PG | benzoic acid | 3 |
| B-53 | terephthalic acid/succinic acid | PG | p-toluic acid | 3 |
| B-54 | 2,3-naphthalenedisulfonic acid | PG | OH | 2 |
| B-55 | terephthalic acid | PG | naphthyl acid | 3 |
| B-56 | terephthalic acid | PG | o-methoxybenzoic acid | 3 |
| B-57 | 2,6-naphthalenedicarboxylic acid/succinic acid | PG | OH | 1 |
| B-58 | 2,6-naphthalenedicarboxylic acid/succinic acid | PG | OH | 2 |
| B-59 | 2,6-naphthalenedicarboxylic acid/succinic acid | PG | OH | 3 |
| B-60 | 2,2-biphenyldicarboxylic acid | PG | OH | 1 |
| B-61 | 2,2-biphenyldicarboxylic acid | PG | OH | 2 |
| B-62 | 2,2-biphenyldicarboxylic acid | PG | OH | 3 |
| B-63 | 2,6-anthracenedicarboxylic acid/succinic acid | PG | OH | 1 |
| B-64 | 2,6-anthracenedicarboxylic acid/succinic acid | PG | OH | 2 |
| B-65 | 2,6-naphthalenedicarboxylic acid | PG/EG | acetic acid | 1 |
| B-66 | 2,6-naphthalenedicarboxylic acid | PG/EG | acetic acid | 2 |
| B-67 | 2,6-naphthalenedicarboxylic acid | DEG | acetic acid | 1 |
| B-68 | 2,6-naphthalenedicarboxylic acid | DEG | acetic acid | 2 |
| B-69 | 2,6-naphthalenedicarboxylic acid/succinic acid | PG | acetic acid | 1 |
| B-70 | 2,6-naphthalenedicarboxylic acid/succinic acid | PG | acetic acid | 2 |
| B-71 | 2,6-naphthalenedicarboxylic acid/succinic acid | PG | p-toluic acid | 1 |
| B-72 | 2,6-naphthalenedicarboxylic acid/succinic acid | PG | p-toluic acid | 2 |

Examples of the retardation developer according to the present invention include, of the above-mentioned retardation developers, disk-shaped compounds and rod-like compounds. Of these, preferred are the triazine-based compounds and rod-like compounds (1) to (7) having plural aromatic rings.

(UV Absorber)

In accordance with the present invention, from the viewpoint of prevention of deterioration of polarizing plates, liquid crystals or the like, a UV absorber is preferably used in a cellulose ester solution. As the UV absorber, those having a superior capacity to absorb ultraviolet rays with a wavelength of not more than 370 nm, and from the point of view of good liquid crystal display property, less absorption of visible light with a wavelength of not less than 400 nm is preferably utilized. Specific examples of the UV absorber that is preferably used in the present invention include hindered phenol-based compounds, hydroxy benzophenone-based compounds, benzotriazole-based compounds, salicylate ester-based compounds, benzophenone-based compounds, cyanoacrylate-based compounds, and nickel complex salt-based compounds.

Examples of the hindered phenol-based compound include 2,6-di-tert-butyl-p-cresol, pentaerythrityl-tetrakis[3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, and tris(3,5-di-tert-butyl-4-hydroxybenzyl)-isocyanurate.

Examples of the benzotriazole-based compound include 2-(2'-hydroxy-5'-methylphenyl)benzotriazole, 2,2-methylenebis(4-(1,1,3,3-tetramethylbutyl)-6-(2H-benzotriazole-2-yl)phenol), (2,4-bis-(n-octylthio)-6-(4-hydroxy-3,5-di-tert-butylanilino)-1,3,5-triazine, triethylene glycol-bis[3-(3-tert-butyl-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorbenzotriazole, (2-(2'-hydroxy-3',5'-di-tert-amylphenyl)-5-chlorbenzotriazole, 2,6-di-tert-butyl-p-cresol, and pentaerythrityl-tetrakis[3-(3,5-di-tert-butyl-4-hydroxyphenyl)propionate].

The amount of these ultraviolet inhibitors added is, as expressed by the term of a mass ratio, preferably 1 ppm to 1.0% in the entire cellulose ester film, and further preferably 10 to 1000 ppm.

(Release Accelerant)

The film of the present invention preferably contains release accelerants from the viewpoint of more increasing detachability. The release accelerant can be included at a ratio of, for example, 0.001 to 1% by mass. It is preferred to add in the amount of not more than 0.5% by mass because release of the release accelerant from the film or the like is hard to take place. It is preferred to add in the amount of not less than 0.005% by mass because desired effects of reducing release can be obtained. Thus, it is preferred that the release accelerant be contained at a ratio of 0.005 to 0.5% by mass, and more preferably at a ratio of 0.01 to 0.3% by mass. As the release accelerants, those that are known can be employed. Organic or inorganic acidic compounds, surfactants, chelating agents or the like can be used. Of these, polyvalent carboxylic acid and esters thereof are effective. In particular, ethyl esters of citric acid can be effectively used.

(Matting Agent)

It is commonly carried out to add fine particles particularly to the film of the present invention in order to prevent damage or worsened transportability when handled. Those are referred to as matting agents, antiblocking agents or creaking inhibitors and have been conventionally utilized. Those are not particularly restricted as long as they are materials exhibiting the above mentioned functions. They may be inorganic compounds of matting agents or may be organic compounds of matting agents.

Preferred specific examples of the above-mentioned inorganic compound of matting agent are preferably inorganic compounds containing silicon (including, for example, silicon dioxide, calcined calcium silicate, hydrated calcium silicate, aluminum silicate, and magnesium silicate), titanium oxide, zinc oxide, aluminum oxide, barium oxide, zirconium oxide, strontium oxide, oxidation antimony, tin oxide, antimony tin oxide, calcium carbonate, talc, clay, calcined kaolin and calcium phosphate, and more preferably inorganic compounds containing silicon and zirconium oxide. Because the turbidity of cellulose ester films can be reduced, silicon dioxide is preferably used in particular.

As fine particles of the above-mentioned silicon dioxide, commercially available products having a trade name of, for example, AEROSILR972, R974, R812, 200, 300, R202, OX50, TT600 (all of which are manufactured by Nippon Aerosil Co., Ltd.) or the like can be used. As fine particles of the above-mentioned zirconium oxide, commercially available products having a trade name of, for example, AEROSILR976, R812 (all of which are manufactured by Nippon Aerosil Co., Ltd.) or the like can be used.

Preferred specific examples of the above-mentioned organic compound of matting agent are preferably are preferably, for example, polymers such as silicone resins, fluorocarbon polymers or acrylic resins. Of these, silicone resins are preferably used. Among the silicone resins, those having a three dimensional web structure is in particular preferred and, commercially available products having a trade name of, for example, TOSPEARL 103, TOSPEARL 105, TOSPEARL 108, TOSPEARL 120, TOSPEARL 145, TOSPEARL 3120, TOSPEARL 240 (all of which are manufactured by Toshiba Silicones Co., Ltd.) or the like.

In cases where these matting agents are added to the cellulose ester solution, a method is not particularly restricted. As long as a desired cellulose ester solution can be obtained, there are no problems in employing any method. For example, an additive may be included at a stage of mixing the cellulose ester and solvent, or may be added after preparing a mixture solution using the cellulose ester and solvent. Further, dope may be added and mixed immediately before casting, which is so-called immediately before addition method. The mixture is used with a screw-type kneading being installed online. To be specific, a static mixer such as in-line mixer is preferred.

In the film of the present invention, as long as the above-mentioned matting agent is not added in a large amount, the film does not have high haze. When the matting agent is actually used in LCD, troubles such as decrease in contrast, occurrence of bright spots or the like are hard to take place. In addition, unless the agent is added too little, the above creaking and mar resistance property can be attained. From these points of view, it is preferred that the agent is contained at a ratio of 0.01 to 5.0% by mass, more preferably contained at a ratio of 0.03 to 3.0% by mass, and in particular preferably contained at a ratio of 0.05 to 1.0% by mass.

(Physical Properties of Film)
(Retardation)

The film of the present invention is preferably adjusted such that the retardation value in the plane Ro (590) as defined above is within a range of 40 to 70 nm and the retardation value in the thickness direction Rt (590) as defined above is within a range of 100 to 200 nm.

Desired retardation can be adjusted by controlling a stretching ratio at the time of film production and the amount of retardation regulator added into the film.

By adjusting the retardation to such a range, a cellulose ester film that may be suitably employed as a retardation film may be provided.

(Haze)

The cellulose ester film of the present invention preferably has a haze of less than 0.5% and more preferably a haze of less than 0.3%. With the haze being less than 0.5%, there is an advantage in that the films have higher transparency and is easier to use as cellulose ester films.

(Elastic Modulus)

The cellulose ester film of the present invention preferably has an elastic modulus of not less than 3.5 and more preferably an elastic modulus of not less than 4.0. With the elastic modulus being not less than 4.0, shrinkage of polarizing plates at the time when durability is tested can be inhibited.

(Bleed Out)

A cellulose ester film was left to stand under a high temperature and high humidity atmosphere of 80° C. and 90% RH for 1000 hours and then the presence of bleed out (crystalline deposition) on the surface of the cellulose ester film was checked by visual observation.

By adding the sugar ester compound that has a structure similar to cellulose esters and has the low degree of substitution, bleed out can be inhibited. Of these, sucrose is particularly preferred from the viewpoint of compatibility and volatility.

(Film Contrast)

The more uniformly the film is oriented, the higher the film contrast value of the cellulose ester film of the present invention is. The above film contrast value is preferably not less than 5000, more preferably not less than 7000 and not more than 10000, and still more preferably not less than 9000 and not more than 10000.

(Polarizing Plane Flatness)

The polarizing plate of the present invention was treated at 60° C., 90% RH for 250 hours, followed by humidity conditioning in a room at 23° C. and 55% RH for 24 hours. The flatness of a polarizing plate was then checked.

Because cellulose esters with a very low substitution degree are readily affected by moisture, shrinkage at the time when durability is tested is a major issue. Effects of the shrinkage in the polarizing plate can be lessened by making the degree of substitution of the sugar ester compound smaller, leaving more hydroxyl groups, and softening suitably hydrogen bonds between the cellulose ester with a low degree of substitution and sugar ester compound.

(Reworkability)

The polarizing plate of the present invention was cut into a square of 20 cm×20 cm in size and bonded together with a glass substrate using an acrylic adhesive. Subsequently, the bonded polarizing plate was removed from the glass by detaching from a corner portion with strength of 5 N. The number of the polarizing plates that were not completely detached was counted to evaluate reworkability.

(Front Contrast)

The backlight of the liquid crystal display of the present invention was kept on for one consecutive hour and then measurement was carried out. EZ-Contrast 160D manufactured by ELDIM was used for the measurement. The luminance of the white display and black display in the display screen in the liquid crystal display from a normal direction was measured. The ratio between the luminance was designated as front contrast for evaluation.

Front contrast=(Luminance of the white display measured from the normal direction the display device)/(Luminance of the black display measured from the normal direction the display device)

If the value of the above front contrast is not less than 1000 there are no practical problems. It is more preferred to be not less than 1100.

(Film Thickness)

The film thickness of the film of the present invention is 10 to 35 μm. Further, it is more preferred to be 20 to 35 μm. With the film thickness being not less than 10 µm resilience of film can be maintained, which is preferred. With the film thickness being not less than 20 µm, flatness of film can be easily maintained. With the film thickness of not more than 35 µm, there is an advantage in terms of the transparency of film.

(Film Length and Width)

It is preferred that the length of the cellulose ester film of the present invention be within a range of 5000 to 10000 m and the width thereof be within a range of 1.9 to 2.5 m.

[Method for Producing Cellulose Ester Film]

A method for producing the film of the present invention includes at least a step of preparing a dope by dissolving a polymer in an organic solvent (a dope preparation step), a step of filtering the dope (a filtration step), a step of casting the dope on a support (a casting step), a step of drying an obtained film (a drying step), and a step of stretching the obtained film (a stretching step), and further includes other steps in accordance with needs.

(Dope Preparation Step)

Specifically, the production method according to the present invention produces the film of the present invention using a solution (dope) of cellulose ester dissolved in an organic solvent by a solvent casting method.

The organic solvent may be used alone or in combination of two or more. In terms of productivity, it is preferable to use a mixture of a solvent (poor solvent) that alone swells or does not dissolve cellulose ester and a solvent (good solvent) that alone dissolves cellulose ester. A preferable range of a mixing ratio of the good solvent and the poor solvent (good solvent: poor solvent) (mass ratio) is 70:30 to 98:2.

As the good solvent, it is preferable to include a solvent selected from ethers having 3 to 12 carbon atoms, ketones having 3 to 12 carbon atoms, esters having 3 to 12 carbon atoms, and halogenated hydrocarbons having 1 to 6 carbon atoms. The ethers, the ketones, and the esters may contain a cyclic structure. In addition, compounds containing two or more of any of functional groups (namely, —O—, —CO—, and COO—) of ether, ketone, and ester can also be used as an organic solvent. The organic solvent may contain other functional groups such as an alcoholic hydroxyl group (hydroxyl group). When the organic solvent contains two or more functional groups, it is sufficient if the number of the carbon atoms thereof is within a specified range of a compound containing any of the functional groups.

Examples of the ethers having 3 to 12 carbon atoms include diisopropyl ether, dimethoxymethane, dimethoxyethane, 1,4-dioxane, 1,3-dioxolane, tetrahydrofuran, anisole, and phenetole.

Examples of the ketones having 3 to 12 carbon atoms include acetone, methyl ethyl ketone, diethyl ketone, diisobutyl ketone, cyclohexanone, and methyl cyclohexanone.

Examples of the esters having 3 to 12 carbon atoms include ethyl formate, propyl formate, pentyl formate, methyl acetate, ethyl acetate, and pentyl acetate.

Examples of the organic solvent having two or more functional groups include 2-ethoxyethyl acetate, 2-ethoxyethanol, and 2-butoxyethanol.

The number of carbon atoms of the halogenated hydrocarbon is preferably 1 to 2, and most preferably 1. The halogen of the halogenated hydrocarbon is preferably chlorine. A percentage of halogen-substituted hydrogen atoms in the halogenated hydrocarbon is preferably 25 to 75% by mole, more preferably 30 to 70% by mole, still more preferably 35 to 65% by mole, and most preferably 40 to 60% by mole. Methylene chloride is a typical halogenated hydrocarbon.

Preferable examples of the poor solvent include methanol, ethanol, n-butanol, cyclohexane, and cyclohexanone.

A cellulose ester solution can be prepared by a common method. The common method means processing performed at a temperature (room temperature or high temperature) of 0° C. or higher. Preparation of the solution can be performed using a dope preparation method and an apparatus therefor used in an ordinary solvent casting method. In a case of the common method, it is preferable to use halogenated hydrocarbon (particularly, methylene chloride) as an organic solvent.

The amount of cellulose ester is adjusted such that cellulose ester is contained in an amount of 10 to 40% by mass in an obtained solution (dope solution). The amount of cellulose ester is more preferably 10 to 30% by mass. An arbitrary additive may be added in the organic solvent (main solvent).

The solution can be prepared by stirring cellulose ester and an organic solvent at room temperature (0 to 40° C.). A solution having high concentration may be stirred under pressurizing and heating conditions. Specifically, cellulose ester and an organic solvent are placed in a pressurized container and the container is tightly closed. Then, under pressurization, stirring is performed while heating to a temperature that is not less than a boiling point at room temperature of the solvent and in a range where the solvent does not boil. The heating temperature is usually 40° C. or higher, preferably 60 to 200° C., and more preferably 80 to 110° C.

The respective components may be roughly mixed together in advance and then placed in the container. Alternatively, the components may be sequentially placed in the container.

The container needs to be configured so as to allow stirring. An inert gas such as nitrogen gas can be injected into the container to pressurize the container. In addition, an increase of vapor pressure of the solvent due to heating may be utilized. Alternatively, after tightly closing the container, the respective components may be added under pressure.

When performing heating, it is preferable to heat the container from outside. For example, a jacket type heating apparatus can be used. Alternatively, the entire container can be heated by providing a place heater outside the container to circulate a liquid through a pipe.

Preferably, a stirring blade is provided inside the container to use the blade for stirring. The stirring blade preferably has a length reaching a position near a container wall. At an end of the stirring blade, preferably, a scraping blade is provided in order to refresh a liquid film of the container wall.

The container may be provided with measuring instruments such as a pressure gauge and a thermometer. In the container, the respective components are dissolved in a solvent. The prepared dope is cooled down and then taken out from the container or taken out therefrom and then cooled down using a heat exchanger or the like.

The solution can be prepared by a cooling dissolution method. The cooling dissolution method can dissolve cellulose ester even in an organic solvent in which cellulose ester can hardly be dissolved by an ordinary dissolution method. In addition, there is an advantageous effect in which using the cooling dissolution method allows rapid preparation of a uniform solution even in the case of a solvent that can dissolve cellulose ester by an ordinary dissolution method.

(Filtration Step)

Filtration of a cellulose ester solution can be performed using various known filtration machines. Specifically, filters can be roughly classified into continuous filters and batch pressure filters. Examples of the continuous filters include belt type, multi-disk type, screw squeeze type, and filter-press type ones. Examples of the batch pressure filters include leaf type and candle type ones.

A filter press apparatus, a paper filter apparatus, a leaf filter apparatus, a drum filter apparatus, a precoat filter apparatus, or the like can be used. The filter press apparatus is industrially most advantageous and may be used by precoating thereonto. One example of the filter press apparatus is a filter press using 40 to 50 plates having a size of about 60 cm square in which each plate has a net and between the nets are arranged a filter paper or a cotton cloth. Such a filter press apparatus may be used in plurality to perform a multi-stage filtration process.

In addition, a leaf filter apparatus can be suitably used.

As a filtration member, a metal sintered filter, a metal nonwoven fabric filter, a cotton cloth filter, a paper filter, or the like may be used.

(Casting Step)

A solution casting method used in the method for producing the film of the present invention is as follows. When performed using a small amount of a dope, the dope is prepared in a glass or metal container, then filtered, and casted on a support having high smoothness, such as a glass plate or a metal plate, using a compact die or doctor blade so as to form a film of desired thickness. After the casting, a primary drying is performed and the film is released from the support. The film is stretched in a frame as needed and then post-drying is performed.

In addition, when producing films in large quantities, particularly continuously, a method and an apparatus for solution-cast film production can be used that are conventionally used to produce a cellulose triacetate film. A dope prepared in a dissolution apparatus (tank) is filtered to prepare a final dope. Then, the dope is supplied from a dope ejection opening to a pressurizing die, for example, through a pressure metering gear pump that can supply a constant amount of solution with high precision by rotation rate, and uniformly casted from a mouthpiece (slit) of the pressurizing die on a support (drum or band) of a casting section endlessly running. Then, a half-dried dope film (also referred to as web) is released from the support at a release point where the support substantially makes a round. Both ends of the obtained web are pinched by clips and the web is conveyed and dried by a tenter while maintaining a width thereof. Next, the dried web is conveyed by a group of rolls of a dryer to complete drying and then wound up to a predetermined length by a winder. The combination of the tenter and the dryer having the group of rolls varies depending on the purpose. Preferably, the drum or band has a mirror-finished surface. Methods for casting and drying in the solvent casting method are described in U.S. Pat. No. 2,336,310, No. 2,367,603, No. 2,492,078, No. 2,492,977, No. 2,492,978, No. 2,607,704, No. 2,739,069, and No. 2,739,070; GB Patents No. 640731 and No. 736892; Japanese Examined Patent Publications No. 1970-4554 and No. 1974-5614; and Japanese Unexamined Patent Application Publications No. 1985-176834, No. 1395-203430, and No. 1987-115035. The dope is preferably casted on a surface of a drum or band adjusted to an arbitrary temperature.

Additionally, in a case of a laminated film, a cellulose acylatate film can be produced from two or more kinds of prepared cellulose ester solutions (dopes) by a solvent casting method.

The dope is casted on a drum or band and the solvent is evaporated to form a film. The concentration of the dope before casting is preferably adjusted so as to contain a solid content in an amount of 18 to 35% by mass. The surface of the drum or band is preferably in a mirror-surface finished state. Methods for casting and drying in the solvent casting method are described in U.S. Pat. No. 2,336,310, No. 2,367,603, No. 2,492,078, No. 2,492,977, No. 2,492,978, No. 2,607,704, No. 2,739,069, and No. 2,739,070; GB Patents No. 640731 and No. 736892, Japanese Examined Patent Publications No. 1970-4554 and No. 1974-5614, and Japanese Unexamined Patent Application Publications No. 1985-176834, No. 1985-203430, and No. 1937-115035.

The dope is preferably casted on a drum or band. After casting, the dope is preferably exposed to air for 2 or more seconds to dry. The obtained film is released from the drum or band and additionally can be dried with high temperature air while sequentially changing the temperature from 100° C. to 160° C. to evaporate a residual solvent. The method above is described in Japanese Examined Patent Publication No. 1993-17844. The method can shorten a time from casting to release. In order to perform the method, the gelation of the dope needs to occur at the surface temperature of the drum or band when casted.

In the present invention, a film can also be produced by casting prepared cellulose ester solutions (dopes), the two or more kinds of cellulose ester solutions on a smooth band or drum as a support.

The method for producing the film of the present invention is not particularly limited and can be a known co-casting method. For example, the film may be produced while laminating by casting respective cellulose ester-containing solutions from a plurality of casting openings spaced apart from each other in a traveling direction of a metal support. Examples of the known co-casting method usable include methods described in Japanese Unexamined Patent Application Publication No. 1986-158414, Japanese Unexamined Patent Application Publication No. 1989-122419, and Japanese Unexamined Patent Application Publication No. 1999-198285. In addition, film production may be performed by casting cellulose ester solutions from two casting openings. Examples of the method include methods described in Japanese Examined Patent Publication No. 1985-27562, Japanese Unexamined Patent Application Publication No. 1986-94724, Japanese Unexamined Patent Application Publication No. 1986-947245, Japanese Unexamined Patent Application Publication No. 1986-104813, Japanese Unexamined Patent Application Publication No. 1986-158413, and Japanese Unexamined Patent Application Publication No. 1994-134933. Additionally, a cellulose ester film casting method described in Japanese Unexamined Patent Application Publication No. 1981-162617 may be used in which a flow of a cellulose ester solution having high viscosity is wrapped with a cellulose ester solution having low viscosity and then the cellulose ester solutions having the respective high and low viscosities are simultaneously extruded. Furthermore, each of Japanese Unexamined Patent Application Publication No. 1986-94724 and Japanese Unexamined Patent Application Publication No. 1986-94725 describes a preferable embodiment in which an external solution contains more of an alcohol component as a poor solvent than an internal solution.

Alternatively, the film may be produced in a method using two casting openings, in which a film molded on a metal support using a first casting opening is released from the support and then a second casting is performed on a side of the film that was in contact with a surface of the metal support. The method is described in, for example, Japanese Examined Patent Publication No. 1969-20235. The cellulose ester solution to be casted may be the same solution or different cellulose ester solutions, and is not particularly limited. In order to give a function to each of a plurality of cellulose ester layers, it is sufficient if each cellulose ester solution corresponding to the function is extruded from each of the casting openings.

Furthermore, regarding a cellulose ester solution according to the present invention, other function layers (such as an adhesive layer, a dye layer, an antistatic layer, an anti-halation layer, a UV absorbing layer, and a polarizing layer) may be simultaneously casted. In the production method for the film of the present invention, the produced film is preferably a multi-layered cast film produced by simultaneous or sequential casting.

In a case of using a single-layer solution of the conventional art, it is necessary to extrude a cellulose ester solution having high concentration and high viscosity in order to form a film with necessary thickness. In this case, poor stability of the cellulose ester solution tends to produce a solid substance, causing pimple defects and poor flatness, so that there have been many problems in the conventional art. In order to solve the problems, a plurality of cellulose ester solutions are casted from casting openings, whereby the solutions having high viscosity can be simultaneously extruded on a metal support. The method has allowed the improvement of flatness and the production of an excellent planar film, as well as using the cellulose ester solutions having high concentration has allowed the reduction of a drying load, resulting in the increase of a film production speed.

In the case of co-casting, thicknesses of an internal side and an external side are not particularly limited, but the thickness of the external side is preferably 0.2 to 50%, and more preferably 2 to 30% of an entire film thickness. As used herein, in a case of co-casting of three or more layers, a total film thickness of a layer contacted with a metal support and a layer contacted with air is defined as a thickness of the external side.

In the case of co-casting, a cellulose ester film having a laminated structure can be produced by co-casting cellulose ester solutions containing additives with different concentrations, such as a plasticizer, a UV absorber, and a matting agent. For example, a cellulose ester film having a structure of a skin layer/a core layer/a skin layer can be produced. For example, the matting agent can be included more in the skin layer or only in the skin layer. The plasticizer and the UV absorber can be included more in the core layer than in the skin layer or only in the core layer. In addition, kinds of the plasticizer and the UV absorber can be different on the core layer and the skin layer. For example, a plasticizer and/or a UV absorber having low volatile properties can be included in the skin layer, whereas a plasticizer having high plasticity or a UV absorber having high UV absorbance can be added to the core layer. In addition, as a preferable embodiment, a release agent can be included only in the skin layer on the side of the film facing a metal support. Additionally, in order to allow the gelation of the solution by cooling a metal support using a cooling drum method, it is preferable to add more alcohol as a poor solvent in the skin layer than in the core layer. Tgs of the skin layer and the core layer may be different, and preferably, the Tg of the core layer is lower than the Tg of the skin layer. Additionally, a viscosity of a solution containing cellulose ester when casted may also be different in the skin layer and the core layer. Preferably, the viscosity of the skin layer is smaller than the viscosity of the core layer, but the viscosity of the core layer may be made smaller than the viscosity of the skin layer.

(Drying Step)

A description will be given a method for drying a web released after having been dried on a drum or belt. A web released at a release position immediately before the drum or belt makes a round is conveyed by a conveyance method allowing the web to pass alternately through a group of rolls arranged in a staggered manner, a method conveying in a non-contacting manner by pinching both ends of the released web with clips or the like, or any other method.

Drying is performed by applying an air having a predetermined temperature onto both surfaces of the web (film) being conveyed or a method using a heating means or the like, such as a microwave. Rapid drying is likely to impair the flatness of a film formed. Accordingly, in an initial stage of drying, preferably, the web is dried at a temperature of a level that does not cause the foaming of a solvent, and after the dryness proceeds, the web is dried at high temperature.

In order to form a film having good flatness, an amount of a residual solvent when the web is released from the support is preferably 10 to 150% by mass, more preferably 20 to 40% by mass or 60 to 130% by mass, and particularly preferably 20 to 30% by mass or 70 to 120% by mass.

The amount of the residual solvent can be represented by the following formula:

$$\text{Amount of residual solvent}(\% \text{ by mass}) = \{(M-N)/N\} \times 100$$

As used herein, M represents a mass of the web at an arbitrary point in time and N represents a mass of the web obtained when the web having the mass M measured was dried at 110° C. for 3 hours.

At a drying step after releasing from the support, the film tends to shrink in a longitudinal direction or a widthwise direction due to evaporation of the solvent. The higher the drying temperature is, the larger the shrinkage is. It is preferable to perform drying while suppressing the shrinkage as much as possible, in terms of obtaining a favorable flatness on a formed film. From this point, for example, as described in Japanese Unexamined Patent Application Publication No: 1987-46625, there is a preferable method (a tenter method) in which all or some parts of the drying step are performed while maintaining the widths of both ends of a web by pinching clips or pins in a widthwise direction. A drying temperature in the above drying step is preferably 100 to 145° C. Depending on the solvent to be used, the temperature of drying, the amount of drying air, the time of drying vary and thus can be appropriately selected according to the kind and combination of solvents to be used. An amount of a residual solvent in the film after drying is preferably 1% by mass or lower and more preferably 0 to 0.1% by mass. In the production of the film of the present invention, the web (film) released from the support is stretched preferably when the amount of the residual solvent in the web is less than 120% by mass.

(Stretching Step)

In the present invention, the web may be stretched positively in the widthwise direction in order to improve film performance. Examples of the method usable to stretch the film include those described in Japanese Unexamined Patent Application Publication No. 1987-115035 and Japanese Unexamined Patent Application Publications No. 1992-152125, No. 1992-284211, and No. 3992-298310, and No. 1999-48271. In many cases, the film is generally stretched at a temperature higher by 10 to 20° C. than a Tg (glass transition temperature). The film of the present invention has high glass transition temperature. Thus, heating at a temperature not less than the glass transition temperature can start the decomposition of the polymer. In such a case, in the present invention, it is effective to perform stretching particularly by processing during drying of the film of the invention. In other words, by stretching the film in a state of containing the solvent, where apparent glass transition temperature is low, stretching can be performed at a temperature that does not cause the decomposition of the polymer. As the method for stretching, for example, when released, the film is stretched by adjusting the speed of the rollers for conveying the film to make a winding speed of the film faster than a release speed of the film. In addition, when drying the film after release, the film is stretched by making a conveying speed of conveyance rollers of a conveyance destination faster than a conveying speed of conveyance rollers arranged on a front side in a conveying direction. In addition, the film can be stretched in the widthwise direction by conveying the film while maintaining the width of the film with a tenter and gradually extending the width of the tenter.

The direction of stretching may be a direction of casting or a direction vertical to the casting direction. In some cases, the film may be stretched in both a casting direction and a direction vertical thereto. At that time, the stretching may be simultaneously performed or performed in one direction and then in the other direction.

A stretching ratio of the film in the widthwise direction (TD direction) (a ratio of a film length after stretching with respect to an initial film length) is preferably 1.03 to 3 times, and more preferably 1.05 to 2.5 times, and still more preferably 1.05 to 1.8 times.

In addition, a stretching ratio of the film in the longitudinal direction (MD direction) is preferably 1.01 to 1.2 times, and more preferably 1.01 to 1.1 times.

The winder that relates to the production of the cellulose ester film in the present invention can be a commonly used winder, and winding can be performed by a winding method such as a constant tension method, a constant torque method, a tapering tension method, or a program tension control method with a constant internal stress. The thickness of the polymer film of the present invention obtained after finished (after drying) in the present invention varies depending on the purpose of use. The thickness of the film is preferably usually in a range of 20 to 200 μm, more preferably in a range of 30 to 150 μm, and most preferably in a range of particularly 30 to 80 μm. Regarding adjustment of the film thickness, in order to obtain a desired thickness, it is sufficient if adjustments are made on the concentration of a solid content in the dope, a slit space of the mousepiece of the die, a pressure for extrusion from the die, a speed of the support, and the like.

Stretching speed is preferably 5%/min to 1000%/min, and more preferably 10%/min to 500%/min. The stretching is performed preferably by a heat roll or/and a radiant heat source (such as an IR heater), or hot air. In addition, in order to increase the uniformity of temperature, a thermostat chamber maybe provided. When uniaxially stretching by roll stretching, a ratio L/W of an inter-roll distance (L) and a film width (W) is preferably 2.0 to 5.0. In addition, in order to prevent the foaming of a web in tenter drying, improve releasability, and prevent the occurrence of dust, the width of a dryer is preferably made shorter than that of the web so that hot air or a heat source of the dryer is not contacted with both edges of the web in a drying apparatus. Additionally, a shielding plate may be arranged inside the both edges of the web so that the hot air or the heat source does not strike a holding portion of the tenter.

The stretching ratio can be selected to form a stretched film having a predetermined thickness. In addition, stretching may be preferable in that a planar state such as flatness can be improved. Furthermore, in order to reduce an unevenness of thickness as much as possible, a stretching temperature gradient may be provided in the widthwise direction, whereby more uniform stretching can be achieved than stretching at a constant temperature.

(Description of Optical Member)

[Polarizing Plate]

The cellulose ester film of the present invention has high optical expression properties and therefore is preferably used as a phase difference film for a polarizing plate protective film. A polarizing plate is formed by bonding and laminating a protective film on at least one surface of a polarizer. The polarizer used can be a conventionally known one, such as a polarizer obtained by stretching a hydrophilic polymer film, such as a polyvinyl alcohol film, processed with a dichroic dye such as iodine. Bonding of the cellulose ester film and the polarizer is not particularly limited and can be performed with an adhesive including an aqueous solution of an aqueous polymer. The aqueous polymer adhesive is preferably a polyvinyl alcohol aqueous solution of completely saponified type.

The film of the present invention can be preferably used in a structure of polarizing plate protective film/polarizer/polarizing plate protective film/liquid crystal cell/film of the present invention/polarizer/polarizing plate protective film or a structure of polarizing plate protective film/polarizer/film of the present invention/liquid crystal cell/film of the present invention/polarizer/polarizing plate protective film. Particularly, by using by bonding the film of the present invention to a liquid crystal cell of a TN type, a VA type, an OCB type, or the like, there can be provided a display having a wider viewing angle and excellent visibility with less coloring. Particularly, a polarizer using a polarizing plate protective film according to the present invention is less deteriorated under high temperature and high humidity conditions and can maintain stable performance for a long period.

[Liquid Crystal Display]

The cellulose ester film of the present invention and a polarizing plate using the film can be used in liquid crystal cells and liquid crystal displays using various display modes. Examples of proposed display modes include TN (Twisted Nematic), IPS (In-Plane Switching), FLC (Ferroelectric Liquid Crystal), AFLC (Anti-ferroelectric Liquid Crystal), OCE (Optically Compensatory Bend), STN (Supper Twisted Nematic), VA (Vertically Aligned), and HAN (Hybrid Aligned Nematic).

An OCB-mode liquid crystal cell is a liquid crystal display using a liquid crystal cell of bend alignment mode in which rod-like liquid crystal molecules are aligned substantially in opposite directions (symmetrically) in an upper part and a lower part of the liquid crystal cell. The OCB-mode liquid crystal cell has been disclosed in each of U.S. Pat. No. 4,583, 825 and No. 5,410,422. Since the rod-like liquid crystal molecules are symmetrically aligned in the upper and the lower parts of the liquid crystal cell, the bend alignment mode liquid crystal cell has an optically self-compensating function. The bend alignment mode liquid crystal display is advantageous in terms of rapid response.

In a VA mode liquid crystal cell, when no voltage is applied, rod-like liquid crystal molecules are aligned substantially vertically.

Examples of the VA mode liquid crystal cell include, in addition to (1) a VA mode liquid crystal cell in a narrow sense in which rod-like liquid crystal molecules are substantially vertically aligned when no voltage is applied and the molecules are aligned substantially horizontally when voltage is applied (described in Japanese Unexamined Patent Application Publication No. 1990-176625), (2) a liquid crystal cell (of MVA mode) in which the VA mode is multi-domained in order to enlarge a viewing angle (described in SID 97, Digest of tech. Papers (proceedings) 28 (1997) 845), (3) a liquid crystal cell of a mode (n-ASM mode) in which rod-like liquid crystal molecules are aligned substantially vertically when no voltage is applied and the molecules are aligned in twisted multi-domain alignment when voltage is applied (Sharp technical report No. 80 P11), and (4) a liquid crystal cell of SURVIVAL mode (Monthly Display, May issue, p 14 (1999)).

A VA mode liquid crystal display includes a liquid crystal cell and two polarizing plates arranged on both sides of the cell. The liquid crystal cell holds liquid crystal between two electrode substrates. In an embodiment of a transmission liquid crystal display in the present invention, one sheet of the film of the present invention is arranged between the liquid crystal cell and one of the polarizing plates or two sheets thereof are arranged between the liquid crystal cell and both polarizing plates.

In another embodiment of the transmission liquid crystal display according to the present invention, an optically compensating sheet made of the film of the present invention is used as a transparent protective film for a polarizing plate arranged between a liquid crystal cell and a polarizer(s). The optically compensating sheet may be used for only a protective film of one polarizing plate (between the liquid crystal cell and the polarizer) or may be used for two protective sheets of both polarizing plates (between the liquid crystal cells and the polarizers). When using the optically compensating sheet only for one of the polarizing plates, the sheet is particularly preferably used as a protective film for a liquid crystal cell facing a backlight polarizing plate in the liquid crystal cell. In bonding to the liquid crystal cell, the film of the present invention is preferably bonded to a VA cell side. The protective film may be an ordinary cellulose ester film. Examples of an ordinary film having a thickness of preferably 40 to 80 μm include commercially available KC4UY (manufactured by Konica Minolta Opto Inc., 40 μm), KC5UX (manufactured by Konica Minolta Opto Inc., 60 μm), and TD 80 (manufactured by Fuji Film Ltd., 80 μm), but not limited thereto.

Examples

Although the present invention will be now concretely described below by way of the examples, the present invention is by no means limited thereto. When described below, "part" represents "part by mass" and "%" represents "% by mass."

[Cellulose Ester Films 1 to 18]

Using a production device shown in FIG. 1, cellulose ester films 1 to 18 were produced by the following procedure.
(Production of Cellulose Ester Film 1)
(Dope Solution)

Cellulose ester (Cellulose acetate propionate, degree of substitution with acetyl group 0.1, propionyl group 1.5): 90 parts by mass Sugar ester compound 5: 10 parts by mass Methylene chloride: 300 parts by mass Ethanol: 40 parts by mass The above components of the dope solution were fed in the main dope preparation tank 1 and, while stirred, heated to completely melted. The resultant was filtered using the main filter 4 (manufactured by Azumi Filter Paper Co., Ltd.: AZUMI FILTER PAPER No. 24) to prepare dope. Subsequently, the dope was filtered using the dope filter 5 (manufactured by Nippon Seisen Co., Ltd.: FINEMETNF).

Subsequently, the dope was uniformly casted into the stainless steel band support 101 at a temperature of 22° C. and with a width of 2 m using a belt casting device. In the stainless steel band support 101, solvent was vaporized until the amount of residual solvent medium became 100% and the resultant was detached from the stainless steel band support 101 with a release tensile force of 162 N/m. The solvent of the web of the detached cellulose ester was vaporized at 35° C. The resulting web was slit to a width of 1.6 m and then dried at a drying temperature of 135° C. while stretched 1.3 fold in a cross direction using the tenter 105. At the time of starting the stretching by the tenter 105, the amount of residual solvent medium was 10%. The resultant was stretched by the tenter 105, loosened at 130° C. for 5 minutes, and conveyed on a number of rolls through the drying zone 106 at 120° C. and 130° C. to complete the drying, followed by slitting to a width of 1.5 m. Both sides of the film were subjected to knurling processing in a width of 10 mm and height of 5 μm. The resultant was winded up on a core with an internal diameter of 6 inch by applying an initial tensile force of 220 N/m and a final tensile force of 110 N/m, thereby obtaining cellulose ester film 1.

A stretching ratio in an MD direction which was calculated from the rate of rotation of stainless steel band support and the rate of operation of the tenter was 1.01 fold.

Subsequently, cellulose ester films 2 to 18 were produced in the same manner as the cellulose ester film 1 except that the type of resin, the type and amount of additive agent, and film thickness were altered as shown in Tables 4 to 6. Note that sugar esters 1 to 10 in Table 5 were a compound in which $R_1$ to $R_8$ in the sugar ester compound represented by the above general formula (1) were substituted by acyl groups shown in Table 5, and the degree of substitution thereof is the degree of substitution shown in Table 5. The amount of residual solvent medium of each of the obtained cellulose ester films 1 to 18 was 0.1%.

[Film 19]

One hundred parts of resin having an alicyclic structure (manufactured by Zeon Corporation, ZEONOR1060R, 0.01% water absorption) was kneaded in a twin screw extruder and extruded into strands, which were cut with a pelletizer to produce pellets. Using this pellet as a raw material, film having a film thickness of 20 μm was formed using an injection molding machine.

[Film 20]

Film 20 was produced in the same manner as the film 19 except that the resin was altered to cyclic olefin resin (COP) (ARTON, manufactured by JSR Corporation).

TABLE 4

| Resin | Degree of substitution acetyl group | Degree of substitution propionyl group | Degree of substitution butanoyl group | Total degree of substitution | total number of carbon atoms | Weight average molecular weight | |
|---|---|---|---|---|---|---|---|
| Cellulose ester 1 | 0.1 | 1.5 | | 1.6 | 4.7 | 115000 | Present invention |
| Cellulose ester 2 | 0.1 | 1.5 | | 1.6 | 4.7 | 140000 | Present invention |
| Cellulose ester 3 | 0.1 | | 1.5 | 1.6 | 6.2 | 120000 | Present invention |
| Cellulose ester 4 | 0.1 | 1.8 | | 1.9 | 5.6 | 150000 | Present invention |
| Cellulose ester 5 | 0.5 | 1.0 | | 1.5 | 4 | 140000 | Present invention |
| Cellulose ester 6 | 0.2 | 1.4 | | 1.6 | 4.6 | 130000 | Present invention |
| Cellulose ester 7 | | 1.1 | | 1.1 | 3.3 | 100000 | Present invention |
| Cellulose ester 8 | | 1.9 | | 1.9 | 5.7 | 150000 | Present invention |
| Cellulose ester 9 | 0.1 | 1.6 | | 1.7 | 5 | 120000 | Present invention |
| Cellulose ester 10 | 2.2 | | | 2.2 | 4.4 | 170000 | Comparative |
| Cellulose ester 11 | 2.0 | | | 2.0 | 4 | 160000 | Comparative |
| Cellulose ester 12 | 1.6 | | | 1.6 | 3.2 | 140000 | Comparative |
| Cellulose ester 13 | 2.9 | | | 2.9 | 5.8 | 180000 | Comparative |
| ZEONOR | | | | | | | Comparative |
| ARTON | | | | | | | Comparative |
| Cellulose ester 14 | 1.1 | 0.8 | | 1.9 | 4.6 | 180000 | Comparative |

TABLE 5

| Sugar ester | Type of acyl group | Degree of substitution |
|---|---|---|
| Sugar ester 1 | Benzoyl | 2.8 |
| Sugar ester 2 | Benzoyl | 6.0 |
| Sugar ester 3 | Benzoyl | 5.2 |
| Sugar ester 4 | Benzoyl | 5.6 |
| Sugar ester 5 | Benzoyl | 4.8 |
| Sugar ester 6 | Benzoyl | 4.0 |
| Sugar ester 7 | Benzoyl | 3.2 |
| Sugar ester 8 | Acetyl | 4.0 |
| Sugar ester 9 | p-methylBenzoyl | 4.8 |
| Sugar ester 10 | Benzyloxycarbonyl | 4.8 |

TABLE 5-continued

| | Compound | Composition (% by mole) |
|---|---|---|
| Polyester 1 | Terephthalic acid/succinic acid/ethylene glycol/propylene glycol | 25:25:25:25 |
| Polyester 2 | 2,6-naphthalenedicarboxylic acid/succinic acid/ethylene glycol/propylene glycol | 10:40:25:25 |
| Polyester 3 | Terephthalic acid/adipic acid/ethylene glycol/propylene glycol | 25:25:25:25 |
| Compound 1 | Triazine ([Formula 9] I-(2)) | |

TABLE 6

| | Resin | Additive Type | Additive Amount (part by mass) | Additive Type | Additive Amount (part by mass) | Film Thickness (μm) | |
|---|---|---|---|---|---|---|---|
| 1 | Cellulose ester 1 | Sugar ester 5 | 10 | — | — | 20 | Present invention |
| 2 | Cellulose ester 1 | Sugar ester 5 | 10 | — | — | 30 | Present invention |
| 3 | Cellulose ester 1 | Sugar ester 5 | 15 | — | — | 25 | Present invention |
| 4 | Cellulose ester 1 | Sugar ester 5 | 20 | — | — | 35 | Present invention |
| 5 | Cellulose ester 1 | Sugar ester 3 | 10 | — | — | 15 | Present invention |
| 6 | Cellulose ester 1 | Sugar ester 6 | 10 | — | — | 20 | Present invention |
| 7 | Cellulose ester 1 | Sugar ester 7 | 20 | — | — | 20 | Present invention |
| 8 | Cellulose ester 1 | Sugar ester 8 | 10 | — | — | 35 | Present invention |
| 9 | Cellulose ester 1 | Sugar ester 9 | 10 | — | — | 10 | Present invention |
| 10 | Cellulose ester 1 | Sugar ester 10 | 10 | — | — | 15 | Present invention |
| 11 | Cellulose ester 2 | Sugar ester 5 | 10 | — | — | 20 | Present invention |
| 12 | Cellulose ester 3 | Sugar ester 2 | 10 | — | — | 35 | Present invention |
| 13 | Cellulose ester 4 | Sugar ester 4 | 10 | — | — | 35 | Present invention |
| 14 | Cellulose ester 5 | Sugar ester 6 | 10 | — | — | 30 | Present invention |
| 15 | Cellulose ester 6 | Sugar ester 5 | 10 | — | — | 35 | Present invention |
| 16 | Cellulose ester 7 | Sugar ester 1 | 10 | — | — | 10 | Present invention |
| 17 | Cellulose ester 8 | Sugar ester 4 | 10 | — | — | 35 | Present invention |
| 18 | Cellulose ester 9 | Sugar ester 5 | 10 | — | — | 25 | Present invention |
| 19 | ZEONOR | | | | | 20 | Comparative example |
| 20 | ARTON | | | | | 20 | Comparative example |
| 28 | Cellulose ester 1 | — | | — | | 20 | Comparative example |
| 29 | Cellulose ester 4 | — | | — | | 25 | Comparative example |
| 30 | Cellulose ester 1 | Sugar ester 5 | 5 | Sugar ester 3 | 5 | 25 | Present invention |
| 31 | Cellulose ester 4 | Sugar ester 4 | 7 | Sugar ester 5 | 3 | 35 | Present invention |
| 32 | Cellulose ester 14 | Sugar ester 4 | 10 | — | — | 35 | Comparative example |
| 33 | Cellulose ester 10 | Sugar ester 2 | 10 | — | — | 30 | Comparative example |
| 34 | Cellulose ester 11 | Sugar ester 2 | 10 | — | — | 30 | Comparative example |

TABLE 6-continued

| | | Additive | | Additive | | Film | |
|---|---|---|---|---|---|---|---|
| | Resin | Tpe | Amount (part by mass) | Type | Amount (part by mass) | Thickness (μm) | |
| 35 | Cellulose ester 12 | Sugar ester 1 | 10 | — | — | 10 | Comparative example |
| 36 | Cellulose ester 13 | Sugar ester 2 | 10 | — | — | 40 | Comparative example |

Figure 2:
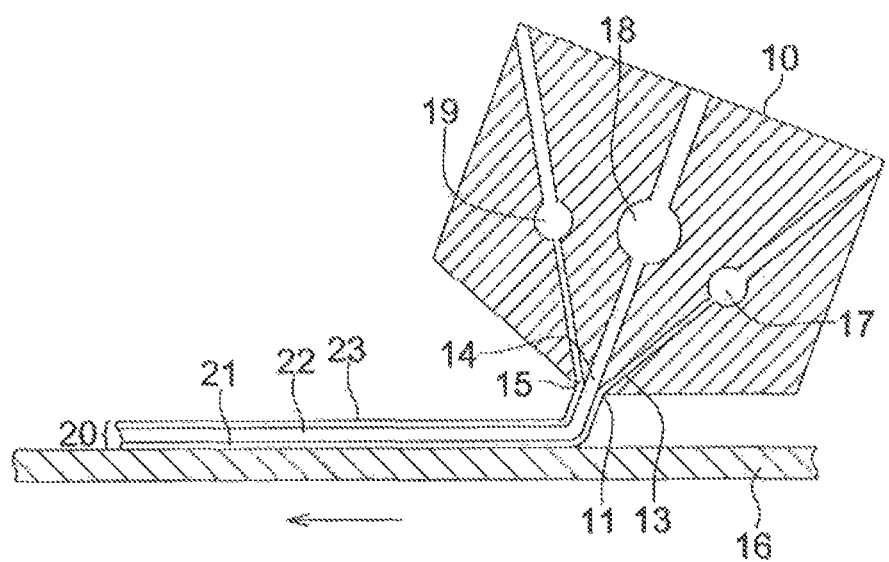
FIG. 2 is a figure representing production of the multilayer cellulose resin film of the present invention.

[Cellulose Ester Film 21]
(Preparation of Cellulose Ester Dope for Core Layer)
  Cellulose ester 10: 90 parts by mass
  Polyester 1: 10 parts by mass
  Dichloromethane: 406 parts by mass
  Methanol: 61 parts by mass
(Preparation of Cellulose Ester Dope for Skin B Layer)
  Cellulose ester 13: 96 parts by mass
  Compound 1: 4 parts by mass
  Matting agent: silica particles with an average particle size of 16 nm (AEROSIL R972 manufactured by Nippon Aerosil Co., Ltd.): 0.12 parts by mass
  Release accelerant: partial ethyl ester compounds of citric acid: 0.05 parts by mass
  Dichlorormethane: 406 parts by mass
  Methanol: 61 parts by mass
(Preparation of Cellulose Ester Dope for Skin A Layer)
  Cellulose ester 13: 96 parts by mass
  Compound 1: 4 parts by mass
  Matting agent: silica particles with an average particle size of 16 nm (AEROSIL R972 manufactured by Nippon Aerosil Co., Ltd.): 0.12 parts by mass Dichloromethane: 406 parts by mass
  Methanol: 61 parts by mass When casted, as shown in FIG. 2, the above three types of the dopes were together casted on a running casting band from the cocasting die 10. Here, by adjusting the amount of each of the dopes casted, the core layer was allowed to be thickest. Simultaneous multilayer casting was carried out such that the film thickness of film after stretching was consequently a value shown in Table 7 below, thereby forming a cast film.

Next, this cast film was detached from the casting band and widened to a stretching ratio of 30% using a tenter, and then loosened at 135° C. for 60 seconds. Subsequently, the film was send to a dry room and thoroughly dried while winded up on a roller and conveyed.

As described above, the laminated cellulose ester film 21 of a dry film thickness of 39 μm was obtained.

[Cellulose Ester Films 22 to 27]
As described in Table 7 below, a cellulose ester film of each of the examples was obtained in the same manner as the cellulose ester film 21 except that the resin, additive agent, and film thickness were altered.

TABLE 7

| | Core layer | | | Skin B layer | | | | | |
|---|---|---|---|---|---|---|---|---|---|
| | CE No. | Additive Type | Amount | Film thickness (μm) | CE No. | Additive Type | Amount | Matting agent Amount | Release accelerant Amount | Film thickness (μm) |
| 21 | 10 | Polyester 1 | 10 | 35 | 13 | Compound 1 | 4 | 0.12 | 0.05 | 2 |
| 22 | 10 | Polyester 2 | 10 | 40 | 13 | Compound 1 | 4 | 0.12 | 0.05 | 1 |
| 23 | 10 | Polyester 3 | 10 | 35 | 13 | Compound 1 | 4 | 0.12 | 0.05 | 2 |
| 24 | 11 | Polyester 1 | 10 | 35 | 13 | Compound 1 | 4 | 0.12 | 0.05 | 2 |
| 25 | 12 | Polyester 1 | 10 | 25 | 13 | Polyester 1 | 4 | 0.12 | 0.05 | 2 |
| 26 | 1 | Polyester 1 | 10 | 20 | 13 | Compound 1 | 4 | 0.12 | 0.05 | 2 |
| 27 | 5 | Polyester 1 | 10 | 25 | 13 | Polyester 1 | 4 | 0.12 | 0.05 | 2 |

| | Skin A layer | | | | |
|---|---|---|---|---|---|
| | CE No. | Additive Type | Amount | Matting agent Amount | Film thickness (μm) | Remarks |
| 21 | 13 | Compound 1 | 4 | 0.12 | 2 | Comparative example |
| 22 | 13 | Compound 1 | 4 | 0.12 | 1 | Comparative example |
| 23 | 13 | Compound 1 | 4 | 0.12 | 2 | Comparative example |
| 24 | 13 | Compound 1 | 4 | 0.12 | 2 | Comparative example |
| 25 | 13 | Polyester 1 | 4 | 0.12 | 2 | Comparative example |
| 26 | 13 | Compound 1 | 4 | 0.12 | 2 | Comparative example |
| 27 | 13 | Polyester 1 | 4 | 0.12 | 2 | Comparative example |

CE No.: Cellulose ester number
* In the table, the unit of Amount is part by mass.

(Evaluation)

For the cellulose ester films 1 to 18 and 21 to 27, and films 19 and 20, the following evaluation was carried out.

(Retardation Value)

The measurement was carried out using an automatic birefringence analyzer KOBRA•WR (manufactured by Oji Scientific Instruments) under circumstances of 23° C. and 55% RH at a wavelength of 590 nm. The obtained measurement value was substituted for the following equations (a) and (b) to determine retardation in the plane Ro and retardation in the thickness direction Rt.

Retardation in the plane $Ro=(nx-ny)\times d$     Equation (a)

Retardation in the thickness direction
$Rt=((nz+ny)/2-nz)\times d$     Equation (b)

(Haze)

Using a turbidimeter (NDH2000, Nippon Denshoku Industries Co., Ltd.), films that had been allowed to stand under circumstances of 23° C. and 55% RH for 24 hours were subjected to measurement of the haze (surface quality haze %) of the film under the same circumstances.

(Elastic Modulus)

With regard to elastic modulus in the present invention, samples were subjected to humidity conditioning under circumstances of 23° C. and 55% RH for 24 hours and the elastic modulus in the TD direction was measured in reference to a method described in JIS K7127 under the same circumstances using a tensile tester TENSILON RTA-100 manufactured by Orientec Co., Ltd., in conditions where the shape of test piece was No. 1 test piece and a testing rate was 10 mm/min.

◎: Not less than 4.0
○: Not less than 3.5 less than 4.0
Δ: Not less than 3.0 less than 3.5
X: Less than 3.0

The elastic modulus is preferably the ○ level or better and in particular preferably the ◎ level.

(Bleed Out)

Cellulose ester films were left to stand under a high temperature and high humidity atmosphere of 80° C. and 90% RH for 1000 hours and then the presence of bleed out (crystalline deposition) on the surface of the cellulose ester film was visually observed.

◎: Occurrence of the bleed out was not recognized on the surface at all.
○: Partial bleed out was slightly recognized on the surface.
Δ: The bleed out was slightly recognized throughout the surface.
X: Apparent bleed out was recognized throughout the surface.

The bleed out is preferably the ○ level or better and in particular preferably the ◎ level.

(Film Contrast)

A direct-type fluorescent tube backlight light source, the upper side of polarizing plate, a sample, the underside of polarizing plate are, in the order from the bottom, placed on a table such that each of the surfaces is level. At this time, the sample and upper side of polarizing plate are set to be rotatable. Light that is emitted from the light source and passed through the upper side of polarizing plate, sample, and underside of polarizing plate in the order mentioned is measured from the vertical direction using BM-5A (manufactured by TOPCON) to determine luminance. In the measurement, the upper side of polarizing plate is first rotated without the sample to set a position at which the luminance is darkest (crossed Nicols state). The sample is inserted and rotated under crossed Nicols to measure the lowest luminance. Next, two polarizing plates of the upper side of polarizing plate and the underside of polarizing plate are disposed in a parallel. Nicols state and the sample is rotated to measure the highest luminance.

The film contrast was determined by (the maximum luminance of the above-mentioned optical compensation sheet disposed between two polarizing plates in the parallel Nicols state)/(the minimum luminance of the above-mentioned optical compensation sheet disposed between two polarizing plates in the parallel Nicols state).

◎: Not less than 9000 less than 10000
○: Not less than 7000 less than 9000
Δ: Not less than 5000 less than 7000
X: Less than 5000

The film contrast is preferably the ○ level or better and in particular preferably the ◎ level.

TABLE 8

| Film No. | Retardation Ro | Retardation Pt | Surface quality Haze | Elastic modulus | B.O. | Film contrast | |
|---|---|---|---|---|---|---|---|
| 1 | 50 | 125 | 0.2 | ○ | ◎ | ◎ | Present invention |
| 2 | 55 | 130 | 0.4 | ◎ | ◎ | ○ | Present invention |
| 3 | 50 | 125 | 0.2 | ○ | ○ | ○ | Present invention |
| 4 | 50 | 125 | 0.2 | ○ | ○ | ○ | Present invention |
| 5 | 45 | 120 | 0.1 | Δ | ◎ | ◎ | Present invention |
| 6 | 50 | 120 | 0.2 | ○ | ◎ | ◎ | Present invention |
| 7 | 45 | 130 | 0.3 | ○ | ○ | ○ | Present invention |
| 8 | 40 | 100 | 0.4 | Δ | ○ | ○ | Present invention |
| 9 | 40 | 110 | 0.1 | Δ | ○ | ◎ | Present invention |
| 10 | 40 | 120 | 0.3 | Δ | ○ | ○ | Present invention |
| 11 | 55 | 135 | 0.2 | ○ | ◎ | ◎ | Present invention |
| 12 | 45 | 120 | 0.4 | Δ | ○ | ○ | Present invention |
| 13 | 40 | 120 | 0.2 | ○ | ○ | ○ | Present invention |
| 14 | 45 | 120 | 0.2 | ○ | ○ | ○ | Present invention |
| 15 | 60 | 150 | 0.2 | ◎ | ◎ | ◎ | Present invention |
| 16 | 45 | 120 | 0.1 | ○ | ○ | ○ | Present invention |
| 17 | 50 | 115 | 0.2 | ○ | ○ | ○ | Present invention |
| 18 | 60 | 135 | 0.2 | ○ | ◎ | ◎ | Present invention |
| 19 | 50 | 125 | 0.5 | Δ | ◎ | Δ | Comparative example |
| 20 | 50 | 125 | 0.5 | Δ | ◎ | Δ | Comparative example |
| 21 | 50 | 120 | 0.8 | ○ | X | X | Comparative example |
| 22 | 50 | 120 | 0.8 | ○ | X | X | Comparative example |
| 23 | 50 | 120 | 0.8 | ○ | X | X | Comparative example |
| 24 | 55 | 125 | 0.8 | ○ | X | X | Comparative example |
| 25 | 45 | 120 | 0.6 | X | X | X | Comparative example |
| 26 | 55 | 130 | 0.6 | X | X | X | Comparative example |
| 27 | 40 | 125 | 0.6 | X | X | X | Comparative example |

TABLE 8-continued

| Film No. | Retardation Ro | Pt | Surface quality Haze | Elastic modulus | B.O. | Film contrast | |
|---|---|---|---|---|---|---|---|
| 28 | 60 | 130 | 0.8 | Δ | ◉ | X | Comparative example |
| 29 | 40 | 120 | 0.8 | Δ | ◉ | X | Comparative example |
| 30 | 53 | 125 | 0.2 | ○ | ◉ | ◉ | Present invention |
| 31 | 40 | 120 | 0.1 | ○ | ◉ | ◉ | Present invention |
| 32 | 50 | 130 | 0.6 | ○ | ○ | X | Comparative example |
| 33 | 40 | 100 | 0.6 | ○ | X | X | Comparative example |
| 34 | 45 | 110 | 0.6 | ○ | ○ | X | Comparative example |
| 35 | 50 | 120 | 0.6 | ○ | ○ | X | Comparative example |
| 36 | 5 | 30 | 0.8 | ○ | X | X | Comparative example |

From Table 8, it is proven that the cellulose ester film of the present invention exhibits, as is clear front the results shown in the table, high transparency and surface quality.

Example 2

Production of Polarizing Plate

Using the obtained cellulose ester films 1 to 18 and 21 to 27, polarizing plates were produced by a method below.

A polyvinyl alcohol film of a thickness of 120 μm was subjected to uniaxial drawing (temperature 110° C., stretching ratio 5 times). This was immersed in a solution comprising iodine 0.075 g, potassium iodide 5 g, and water 100 g for 60 seconds and then immersed in a 68° C. solution comprising potassium iodide 6 g, boric acid 7.5 g, and water 100 g. This was rinsed with water and dried to obtain a polarizer.

Subsequently, according to the following steps 1 to 5, the polarizer and the above-mentioned cellulose ester films 1 to 18 and 21 to 27 were bonded together; and, for the backside, a commercially available cellulose ester film (KC4UY, manufactured by Konica Minolta Opto Products Co., Ltd.) was bonded as a polarizing plate protective film, thereby producing produce polarizing plates.

Step 1: The film cellulose ester films 1 to 18 and 21 to 27 were immersed in 2 mol/L potassium hydroxide solution at 50° C. for 30 seconds, and then rinsed with water and dried then, thereby obtaining film whose surface was saponified.

Step 2: The above-mentioned polarizer was immersed in a tank containing a polyvinyl alcohol adhesive with a solid content 2% by mass for 1 to 2 seconds.

Step 3: Excessive adhesive stack to the polarizer in the step 2 was softly wiped away. This was placed on the cellulose ester film treated in the step 1. The backside cellulose ester film was further placed to be disposed.

Step 4: The cellulose ester films 1 to 18 and 21 to 27 and polarizer and the backside cellulose ester film, which were layered in the step 3, were pasted with a pressure of 20 to 30 N/cm² and at a feed rate of about 2 m/min.

Step 5: The sample produced in the step 4 in which the polarizer, cellulose ester films 1 to 18 and 21 to 27, and backside cellulose ester film were stuck together was dried for 2 minutes in an 80° C. dryer, thereby producing corresponding polarizing plates 1 to 18 and 21 to 27.

The films 19 and 20 were subjected to the same method to obtain polarizing plates 19 and 20 except that the films were applied with an ultraviolet curing-type adhesive (KRX492-25 manufactured by ADEKA), instead of the adhesive comprising an aqueous solution of polyvinyl alcohol-based resin, using a coating applicator, and then irradiated with ultraviolet rays (irradiated ultraviolet wavelength: 365 nm, adhesive film thickness: 3 μm) in an cumulative amount of light of 300 mJ/cm² for 5 seconds by an ultraviolet irradiation device to cure the ultraviolet curing-type adhesive for the pasting.

(Polarizing Plate Flatness)

The polarizing plate of the present invention was subjected to treatment at 60° C. and 90% RH for 250 hours, followed by humidity conditioning in a room at 23° C. and 55% RH for 24 hours to check the flatness of the polarizing plate.

◉: There is no wave undulation or crease.
○: There is little wave undulation or crease.
Δ: Wave undulation or crease is observed a little.
X: Wave undulation or crease is observed.

With regard to the flatness, with the Δ level or better, there are no problems in practice. The ○ level is preferred and the ◉ level is in particularly preferred.

(Reworkability)

Under an 23° C. and 55% RH atmosphere, the produced polarizing plate is cut into a square of 20 cm×20 cm in size and bonded together with a glass substrate using an acrylic-based adhesive. Subsequently, the bonded polarizing plate was detached from the glass from a corner portion with a strength of 5 N. This operation was carried out for 100 polarizing plates per each type of the samples; and the number of the polarizing plates that were cracked and failed to be completely detached was counted. The reworkability was ranked based on the following criteria.

◉: 0 to 5 polarizing plates
○: 6 to 10 polarizing plates
Δ: 11 to 15 polarizing plates
X: 16 polarizing plates or more With regard to the reworkability, with the Δ level or better, there are no problems in practice. The ○ level is preferred and the ◉ level is in particularly preferred.

TABLE 9

| Polarizing plate No. | Flatness | Reworkability | |
|---|---|---|---|
| 1 | ○ | ○ | Present invention |
| 2 | ◉ | ◉ | Present invention |
| 3 | ○ | ○ | Present invention |
| 4 | ○ | ○ | Present invention |
| 5 | Δ | Δ | Present invention |
| 6 | ○ | ○ | Present invention |
| 7 | ○ | ○ | Present invention |
| 8 | ○ | Δ | Present invention |
| 9 | Δ | Δ | Present invention |
| 10 | Δ | Δ | Present invention |
| 11 | ○ | ○ | Present invention |
| 12 | ○ | Δ | Present invention |
| 13 | ○ | ○ | Present invention |

TABLE 9-continued

| Polarizing plate No. | Flatness | Reworkability | |
|---|---|---|---|
| 14 | ○ | ○ | Present invention |
| 15 | ⊚ | ⊚ | Present invention |
| 16 | Δ | ○ | Present invention |
| 17 | ○ | ○ | Present invention |
| 18 | ○ | ○ | Present invention |
| 19 | Δ | Δ | Comparative example |
| 20 | Δ | Δ | Comparative example |
| 21 | ○ | ○ | Comparative example |
| 22 | ○ | ○ | Comparative example |
| 23 | ○ | ○ | Comparative example |
| 24 | ○ | ○ | Comparative example |
| 25 | X | X | Comparative example |
| 26 | X | X | Comparative example |
| 27 | X | X | Comparative example |
| 28 | Δ | Δ | Comparative example |
| 29 | Δ | Δ | Comparative example |
| 30 | ⊚ | ○ | Present invention |
| 31 | ⊚ | ○ | Present invention |
| 32 | ○ | ○ | Comparative example |
| 33 | ○ | ○ | Comparative example |
| 34 | ○ | ○ | Comparative example |
| 35 | X | ○ | Comparative example |
| 36 | ○ | ○ | Comparative example |

From Table 9, it is proven that the polarizing plate using the cellulose ester film of the present invention has high flatness and is excellent in the rework property.

Example 3

Production of Liquid Crystal Display

A liquid crystal panel for carrying out view angle measurement using the polarizing plate obtained in Example 2 was produced in the following manner to evaluate properties as a liquid crystal display.

Both sides of polarizing plates that were preliminarily bonded of a VA mode type liquid crystal display (manufactured by SONY BRAVIAV1, 40-inch type) were detached. The polarizing places produced above were bonded to the both sides such that the glass side of liquid crystal cell was on the side of the films 1 to 27.

On this occasion, that was carried out such that an absorption axis pointed in the same direction as the polarizing plate that was preliminarily pasted and pro. Each of liquid crystal displays 1 to 27 corresponding to the polarizing plates 1 to 27 was produced.

For this liquid crystal display, contrast was evaluated. The results are shown in the table.

<Evaluation of Liquid Crystal Display>>
[Front Contrast]

For evaluation of contrast property of a liquid crystal display, luminance of white display and black display from the normal direction of the display screen in the liquid crystal display was measured using EZ-contrast 160D manufactured by ELDIM; and a ratio thereof was designated as front contrast.

Front contrast=(Luminance of white display measured from the normal direction of the display device)/(Luminance of black display measured from the normal direction of the display device)

Evaluation ranking of the contrast was determined as follow:
⊚: 1100 to 1200 or more
○: 1000 to 1100 or less
X: Less than 1000

With the ○ level or better, there are no problems in practice.

TABLE 10

| Liquid crystal display No. | Contrast | |
|---|---|---|
| 1 | ⊚ | Present invention |
| 2 | ○ | Present invention |
| 3 | ○ | Present invention |
| 4 | ○ | Present invention |
| 5 | ⊚ | Present invention |
| 6 | ⊚ | Present invention |
| 7 | ○ | Present invention |
| 8 | ○ | Present invention |
| 9 | ⊚ | Present invention |
| 10 | ○ | Present invention |
| 11 | ⊚ | Present invention |
| 12 | ○ | Present invention |
| 13 | ○ | Present invention |
| 14 | ○ | Present invention |
| 15 | ⊚ | Present invention |
| 16 | ○ | Present invention |
| 17 | ○ | Present invention |
| 18 | ⊚ | Present invention |
| 19 | Δ | Comparative example |
| 20 | Δ | Comparative example |
| 21 | X | Comparative example |
| 22 | X | Comparative example |
| 23 | X | Comparative example |
| 24 | X | Comparative example |
| 25 | X | Comparative example |
| 26 | X | Comparative example |

TABLE 10-continued

| Liquid crystal display No. | Contrast | |
|---|---|---|
| 27 | X | Comparative example |
| 28 | X | Comparative example |
| 29 | X | Comparative example |
| 30 | ◎ | Present invention |
| 31 | ◎ | Present invention |
| 32 | X | Comparative example |
| 33 | X | Comparative example |
| 34 | X | Comparative example |
| 35 | X | Comparative example |
| 36 | X | Comparative example |

From the results shown in Table 10, the liquid crystal display employed the cellulose ester film of the present invention is found to have high contrast.

DESCRIPTION OF THE NUMERALS

1 Main dope preparation tank,
2 Dope supplying pump,
3 Dope standing tank,
4 Main filter,
5 Dope filter,
6 In-line loading solution tank,
7 In-line loading solution circulation filter,
8 In-line loading solution supplying pump,
9 In-line loading solution supplying pump,
100 Static mixer,
101 Stainless steel band,
102 Release roll,
103 Film,
104 Tenter•drying device,
105 Roll conveying•drying device (drying zone),
106 Film winding device,
10 Cocasting die,
11 Pipe sleeve unit,
13, 15 Slit for outer layers,
14 Slit for base layers,
16 Metal support,
17, 19 Dope for outer layers,
18 Dope for base layers,
20 Multilayer structure web,
21 Skin B layer,
22 Core layer,
23 Skin A layer.

What is claimed is:

1. A cellulose ester film comprising:
a cellulose ester(s) having substitution(s) by an acyl group(s) having 3 to 4 carbon atoms, or an acyl group(s) having 2 carbon atoms and an acyl group(s) having 3 to 4 carbon atoms, a degree of substitution with acyl group(s) having 3 to 4 carbon atoms being not less than 0.9 and less than 2.0, said cellulose ester having a total degree of substitution with said acyl group(s) of not less than 1.0 and less than 2.0 and sufficing a weight average molecular weight of not less than 50000 and not more than 150000; and
a sugar ester compound(s) having not less than one and not more than three sugar unit structures, said sugar unit structure being at least one of a pyranose structure or furanose structure, wherein an average percentage of substitution in said sugar unit structure is 35% to 75%;
wherein said cellulose ester film has a film thickness of 10 to 35 μm, and a haze of less than 0.5%.

2. The cellulose ester film according to claim 1, wherein said sugar ester compound is a compound represented by the following general formula (1):

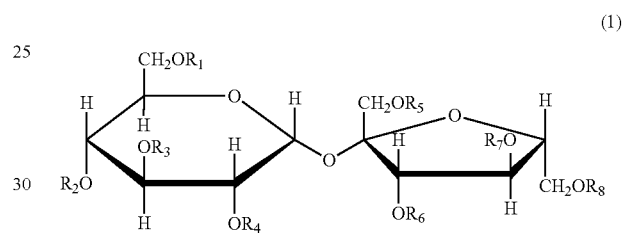

(1)

wherein $R^1$ to $R^8$ represent hydrogen or a substituent group other than hydrogen and an average degree of substitution of said sugar ester compound is 2.8 to 6.0.

3. The cellulose ester film according to claim 2, wherein said cellulose ester(s) has a degree of substitution with acyl group(s) having 2 carbon atoms of not less than 0 and not more than 0.5, and wherein said substituent groups other than hydrogen is an acyl group.

4. The cellulose ester film according to claim 1, wherein said sugar ester compound is a mixture with different degrees of substitution.

5. The cellulose ester film according to claim 1, wherein the number of total carbon atoms of said acyl group(s) of said cellulose ester is more than 4.4.

6. The cellulose ester film according to claim 1, wherein a value of retardation in a plane Ro(590) of said cellulose ester film is in a range of from 40 to 70 nm; a value of retardation in a thickness direction Rt(590) is in a range from 100 to 200 nm; and a film contrast is 7000 to 10000.

7. A polarizing plate comprising said cellulose ester film according to claim 1.

8. A liquid crystal display comprising said cellulose ester film according to claim 1.

* * * * *